US008195052B2

(12) United States Patent
Ohtou et al.

(10) Patent No.: US 8,195,052 B2
(45) Date of Patent: Jun. 5, 2012

(54) OPTICAL WAVELENGTH MULTIPLEXING SYSTEM, OPTICAL WAVELENGTH MULTIPLEXING METHOD, AND COMPUTER PRODUCT

(75) Inventors: Makoto Ohtou, Fukuoka (JP); Akira Yamamoto, Fukuoka (JP); Tatsuo Nagayoshi, Fukuoka (JP); Katsumi Sugawa, Fukuoka (JP); Hideaki Sugiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1079 days.

(21) Appl. No.: 12/000,015

(22) Filed: Dec. 6, 2007

(65) Prior Publication Data
US 2008/0138074 A1    Jun. 12, 2008

(30) Foreign Application Priority Data

Dec. 8, 2006 (JP) ................................. 2006-332498

(51) Int. Cl.
H04B 10/08   (2006.01)
G02B 6/12    (2006.01)
H04B 10/16   (2006.01)
H04B 10/04   (2006.01)

(52) U.S. Cl. .............. 398/158; 398/15; 398/33; 398/38; 398/94; 398/95; 398/140; 398/173; 398/45; 359/334

(58) Field of Classification Search .................. 398/158, 398/45, 79, 38
See application file for complete search history.

(56) References Cited

U.S. PATENT DOCUMENTS

| 7,133,610 | B1 * | 11/2006 | Shimura et al. | 398/15 |
| 7,280,761 | B2 * | 10/2007 | Aono | 398/94 |
| 7,400,590 | B1 * | 7/2008 | Rygh et al. | 370/254 |
| 7,660,537 | B2 * | 2/2010 | Fishman et al. | 398/193 |
| 2002/0131120 | A1 * | 9/2002 | Araki et al. | 359/139 |
| 2003/0058895 | A1 * | 3/2003 | Chang et al. | 370/532 |
| 2003/0194232 | A1 * | 10/2003 | Arecco et al. | 398/2 |
| 2004/0008987 | A1 * | 1/2004 | Pearson et al. | 398/43 |
| 2004/0197105 | A1 * | 10/2004 | Khatana et al. | 398/173 |
| 2004/0208432 | A1 * | 10/2004 | Mak et al. | 385/24 |
| 2005/0105908 | A1 * | 5/2005 | Oikawa | 398/85 |
| 2005/0163505 | A1 * | 7/2005 | Kinoshita et al. | 398/38 |
| 2005/0184374 | A1 * | 8/2005 | Ohe et al. | 257/678 |
| 2005/0226621 | A1 * | 10/2005 | Kikuchi et al. | 398/83 |

(Continued)

FOREIGN PATENT DOCUMENTS
EP       0507367 A1 *   10/1992
(Continued)

OTHER PUBLICATIONS

Takashi Translation.*
(Continued)

Primary Examiner — Shi K Li
Assistant Examiner — Oommen Jacob
(74) Attorney, Agent, or Firm — Fujitsu Patent Center

(57) ABSTRACT

An optical wavelength multiplexing system includes transmission-side and reception-side optical wavelength multiplexers, and terminal devices, which are connected to each other by optical fiber cables. Optical wavelength converters in the transmission-side optical wavelength multiplexers are connected to ports respectively. The optical wavelength converter converts an input optical signal into an arbitrary preset wavelength to generate a converted optical signal. The port has a predetermined wavelength preset therein. Each optical power level of input converted optical signals is compared with each optical power level of optical signals of respective wavelengths set in the ports. When a difference is detected in the comparison result, it is determined that an optical wavelength converter is incorrectly connected to the port.

9 Claims, 7 Drawing Sheets

U.S. PATENT DOCUMENTS

| | | | |
|---|---|---|---|
| 2005/0259316 A1* | 11/2005 | Stephens | 359/334 |
| 2006/0152796 A1* | 7/2006 | Hayashi et al. | 359/334 |
| 2007/0086332 A1* | 4/2007 | Way et al. | 370/223 |
| 2007/0154216 A1* | 7/2007 | Kim et al. | 398/71 |
| 2008/0055095 A1* | 3/2008 | Hackmeister | 340/583 |
| 2008/0138074 A1* | 6/2008 | Ohtou et al. | 398/79 |

FOREIGN PATENT DOCUMENTS

| | | |
|---|---|---|
| JP | 2000-174397 | 6/2000 |
| JP | 2001-44970 | 2/2001 |
| JP | 2001-358666 | 12/2001 |
| JP | 2004-32088 | 1/2004 |
| JP | 2004032088 A * | 1/2004 |
| JP | 2005-72802 | 3/2005 |

OTHER PUBLICATIONS

Office Action mailed Oct. 28, 2008 and issued in corresponding Japanese Patent Application No. 2006-332498.

* cited by examiner

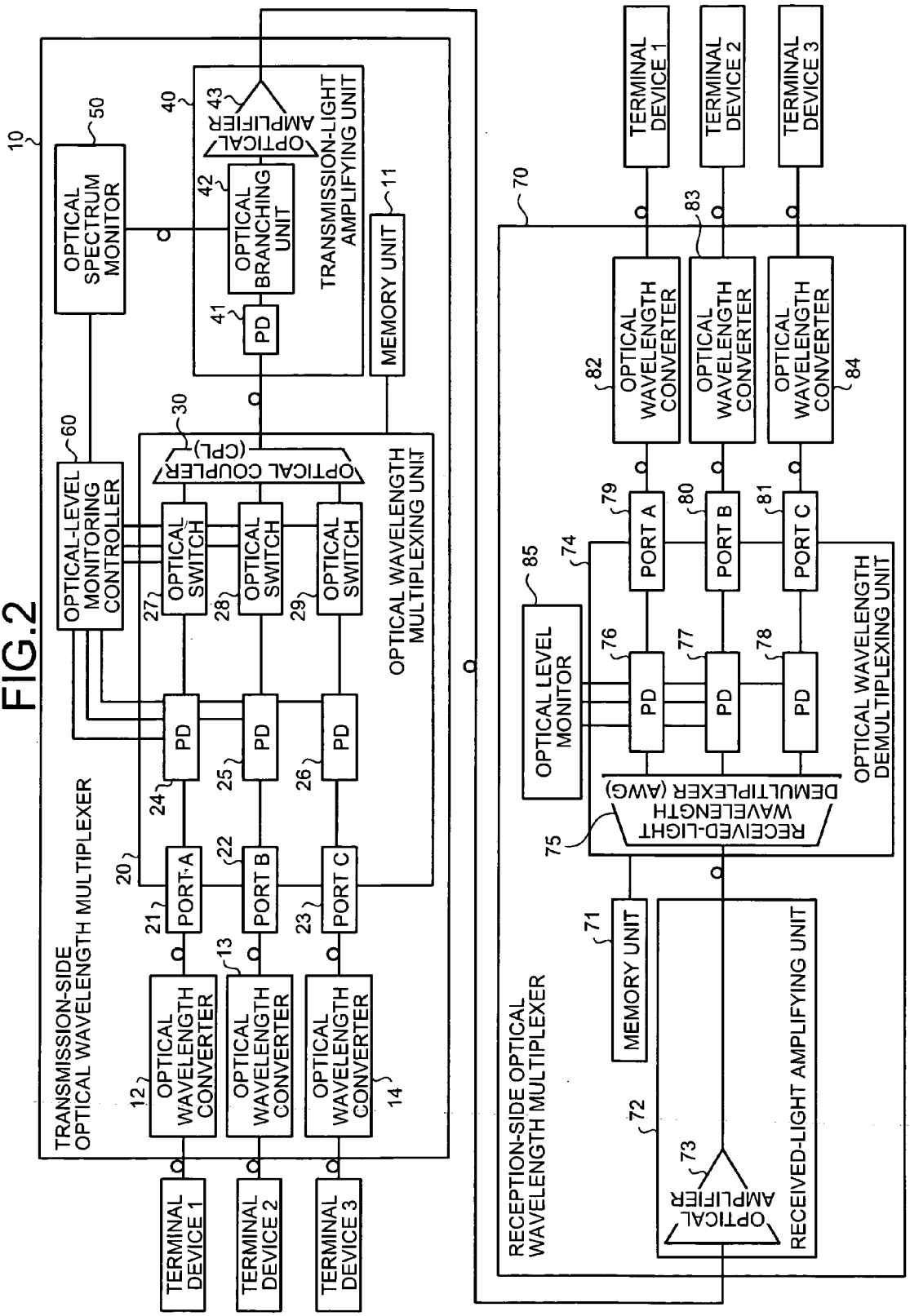

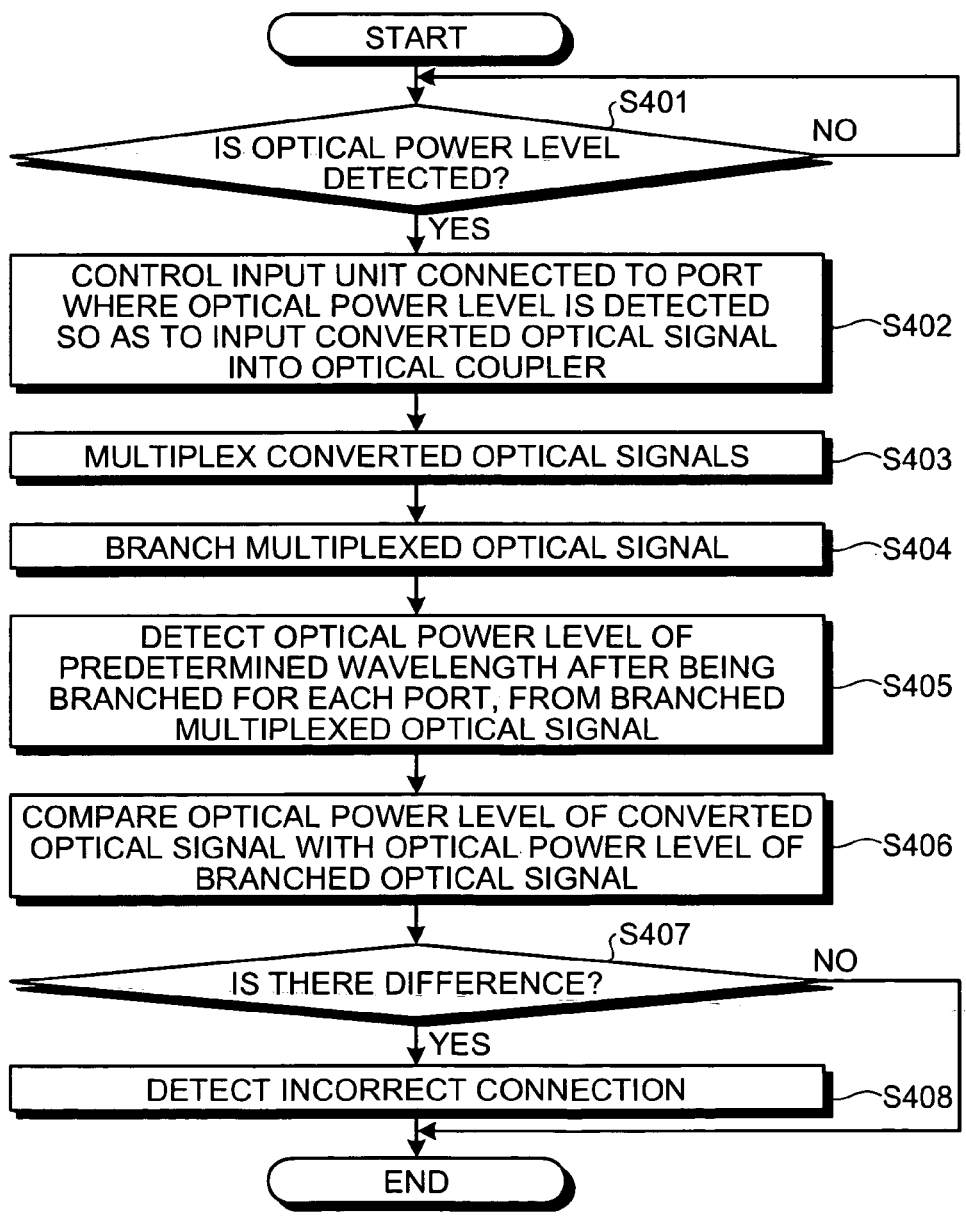

OPTICAL WAVELENGTH MULTIPLEXING SYSTEM, OPTICAL WAVELENGTH MULTIPLEXING METHOD, AND COMPUTER PRODUCT

BACKGROUND OF THE INVENTION

1. Field of the Invention

The present invention relates to a technology for an optical wavelength multiplexing system, an optical wavelength multiplexing method, and a computer product.

2. Description of the Related Art

High volume data such as images and moving images is transmitted more frequently than ever before with the spread of the Internet. To transmit such high volume data at high speed, a network line using x Digital Subscriber Line (xDSL) technology enabling high-speed network communication is generally and frequently used. Recently, however, an optical network which is a higher speed network such as Fiber To The Home (FTTH) using an optical fiber cable is also used.

As a technology of effectively using the optical fiber cable, wavelength division multiplexing (WDM) draws attention. The WDM is a technology for transmitting a plurality of signals having different wavelengths over one optical fiber cable. Specifically, this technology increases transmission capacity of the optical fiber cable by simultaneously using the optical signals having different wavelengths.

In an optical wavelength multiplexing system including an Optical Add and Drop Multiplexer (OADM) that adds an optical signal having an arbitrary wavelength and drops and receives the optical signal using the WDM, individual frequencies are assigned to a plurality of ports respectively. An optical wavelength converter that converts (outputs) an input optical signal into an optical signal having an assigned frequency is connected to each of the ports.

Specifically, optical wavelength converters that output assigned frequencies need to be correctly connected to the ports respectively. However, because the number of optical wavelengths to be multiplexed in the OADM increases in recent years, the OADM is caused to have many ports. As a result, there occur many cases of causing an incorrect connection. The incorrect connection indicates that an optical wavelength converter outputs a wavelength different from the wavelength assigned to the connected port and available for optical wavelength division multiplexing. Hence, various technologies for detecting such an incorrect connection are disclosed.

Japanese Patent Application Laid-Open No. 2004-32088 discloses a technology of detecting the incorrect connection by using a wavelength-dependent arrayed waveguide grating (AWG) in multiplexing optical wavelengths. Specifically, the AWG having the wavelength dependency has a characteristic that, even when an optical signal having a wavelength different from the wavelength assigned to each port is input, a passing of the optical signal through the AWG is prevented. By using this characteristic, the incorrect connection is detected based on a comparison of an optical power level at each port of the AWG to which the wavelength is assigned with an optical power level after multiplexing and branching optical signals having different wavelengths input through the ports. Specifically, when there is any port which is incorrectly connected, an error is presented between optical power levels before and after the multiplexing of the optical signals. Therefore, by detecting the error, the incorrect connection in each port is detected.

However, the conventional technology has a problem that the arrayed waveguide grating (AWG) is very expensive, thereby causing the cost for constructing the optical wavelength multiplexing system to increase.

SUMMARY OF THE INVENTION

It is an object of the present invention to at least partially solve the problems in the conventional technology.

According to one aspect of the present invention, an optical wavelength multiplexing system includes a plurality of optical wavelength converters that convert input optical signals into arbitrary preset wavelengths and generate converted optical signals respectively; a plurality of ports in which predetermined wavelengths are preset and to which the optical wavelength converters are connected respectively; a plurality of first optical-power-level detectors that are connected to the ports respectively, and detect optical power levels of the converted optical signals input into the ports respectively; an optical signal multiplexer that multiplexes all the converted optical signals input from the ports to generate a multiplexed optical signal, the generated multiplexed optical signal being transmitted to a receiving device in the optical wavelength multiplexing system and demultiplexed into optical signals of predetermined wavelengths; a plurality of input units that are provided in the ports respectively and input the converted optical signals input into the ports, into the optical signal multiplexer; an input controller that controls each of the input units so as not to input the converted optical signal into the optical signal multiplexer until an optical power level of the converted optical signal is detected by the first optical-power-level detector, and also controls each of the input units so as to input the converted optical signal into the optical signal multiplexer when the optical power level of the converted optical signal is detected; a second optical-power-level detector that detects, from the multiplexed optical signal, each optical power level of the predetermined wavelengths set in the ports after the converted optical signals are multiplexed; and an incorrect connection detector that compares each optical power level of the converted optical signals detected by the first optical-power-level detector with each optical power level of the predetermined wavelengths detected by the second optical-power-level detector, and detects that an optical wavelength converter that converts the optical signal into a wavelength different from the predetermined wavelength set in a connected port is incorrectly connected to the port when there is a difference therebetween in the comparison result.

According to another aspect of the present invention, an optical wavelength multiplexing method is used in an optical wavelength multiplexing system where a plurality of optical wavelength converters which convert input optical signals into arbitrary preset wavelengths and generate converted optical signals respectively, are respectively connected to a plurality of ports in which predetermined wavelengths are preset, and where the converted optical signals are multiplexed in a transmitting device and transmitted to a receiving device to be demultiplexed into optical signals of predetermined wavelengths. The optical wavelength multiplexing method includes detecting each optical power level of the converted optical signals input into the ports; multiplexing all the converted optical signals input from the ports to generate a multiplexed optical signal; inputting the converted optical signals input into the ports for the multiplexing; controlling the inputting so as not to input the converted optical signal for the multiplexing until an optical power level of the converted optical signal is detected in the detecting, and also controlling the inputting so as to input the converted optical signal for the multiplexing when the optical power level of the converted optical signal is detected; detecting, from the multiplexed optical signal, each optical power level of the predetermined wavelengths set in the ports after the converted optical signals are multiplexed; and comparing each optical power level of the converted optical signals detected in the detecting of each optical power level of the converted optical signals with each optical power level of the predetermined wavelengths detected in the detecting of each optical power level of the predetermined wavelengths after the converted optical signals are multiplexed, and detecting that an optical wavelength converter that converts the optical signal into a wavelength different from the predetermined wavelength set in a connected port is incorrectly connected to the port when there is a difference therebetween in the comparison result.

According to still another aspect of the present invention, a computer-readable recording medium stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a block diagram of a configuration of the optical wavelength multiplexing system according to the first embodiment;

FIG. 3 is a diagram of an example of information stored in a memory unit;

FIG. 4 is a flowchart of a process of detecting an incorrect connection in the optical wavelength multiplexing system according to the first embodiment;

DETAILED DESCRIPTION OF THE PREFERRED EMBODIMENTS

Figure 1:
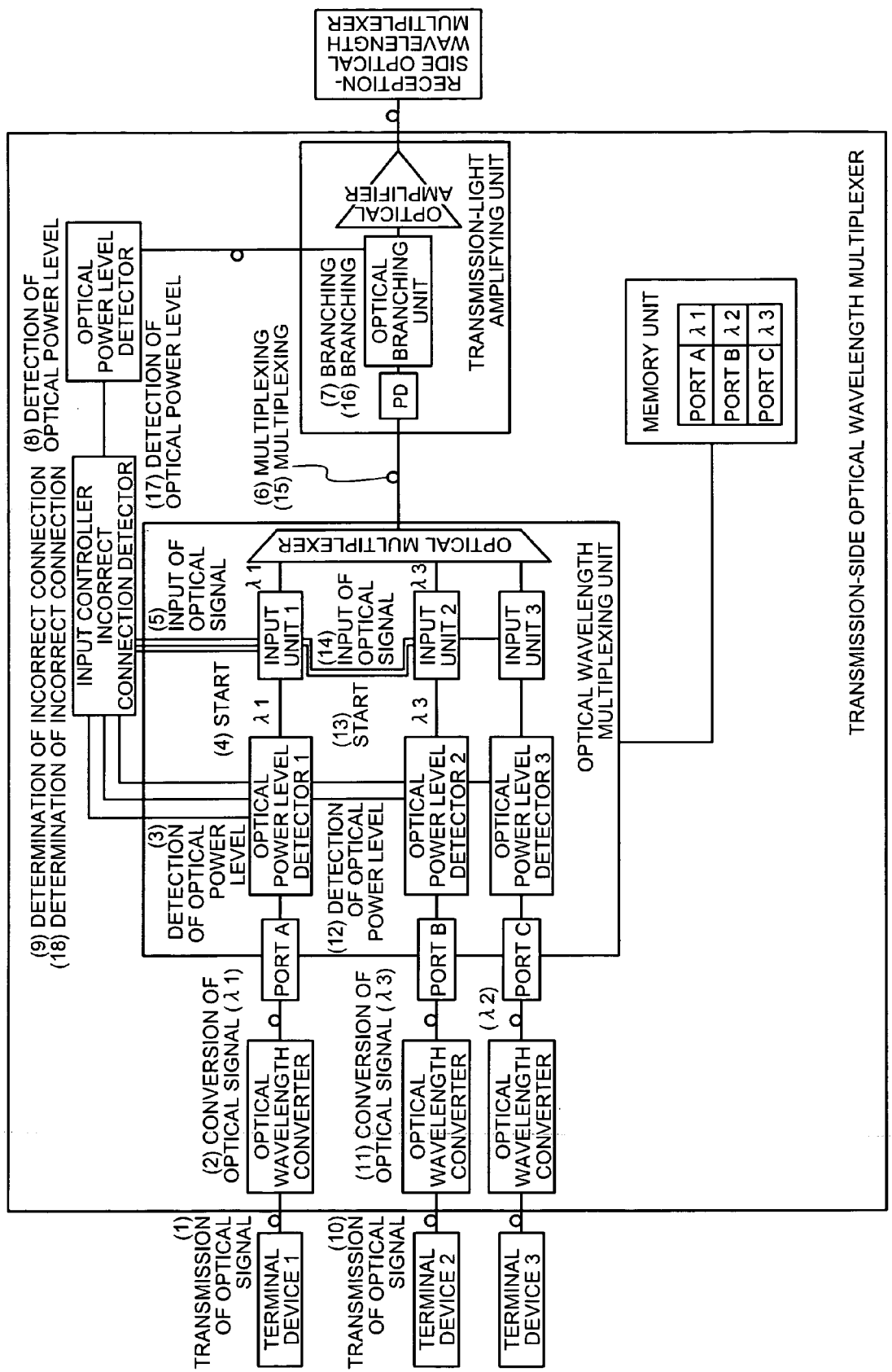
FIG. 1 is a schematic of an overview and characteristics of an optical wavelength multiplexing system according to a first embodiment.

Exemplary embodiments of the present invention will be explained in detail below with reference to the accompanying drawings. It should be noted that key terms used in the following embodiments, an overview and characteristics of an optical wavelength multiplexing system according to a first embodiment, a configuration and a procedure in the optical wavelength multiplexing system according to the first embodiment, and advantages of the first embodiment will be explained in this order, and then other embodiments will be explained.

At first, the key terms used in the embodiments will be explained below. The "optical wavelength multiplexing system" indicates a system that realizes an optical communication network. The system includes a transmission-side optical wavelength multiplexer and a reception-side optical wavelength multiplexer. The system allows an increase in transmission capacity of an optical fiber cable by transmitting a plurality of signals having different wavelengths over the optical fiber cable for connecting between the transmission side and the reception side, namely, by simultaneously using the plurality of optical signals having different wavelengths. It should be noted that the "optical wavelength multiplexing system" corresponds to "optical wavelength multiplexing system" in claims.

The transmission-side optical wavelength multiplexer causes optical wavelength converters to convert optical signals input from terminal devices into arbitrary wavelengths respectively, and causes an optical wavelength multiplexing unit to multiplex the converted optical signals. The transmission-side optical wavelength multiplexer further causes a transmission-light amplifying unit to amplify the multiplexed optical signal to an optical level at which the optical signal can be transmitted, and transmit the optical signal of that level to the reception-side optical wavelength multiplexer.

The reception-side optical wavelength multiplexer causes a received-light amplifying unit to amplify the multiplexed optical signal degraded during the transmission from the transmission-side optical wavelength multiplexer, and causes an optical wavelength demultiplexing unit to demultiplex the multiplexed optical signal into the predetermined wavelengths before being multiplexed. The reception-side optical wavelength multiplexer further causes optical wavelength converters to reversely convert the demultiplexed optical signals into respective original signals and transmit the original signals to the terminal devices, respectively.

Each of the optical wavelength multiplexing unit in the transmission-side optical wavelength multiplexer and the optical wavelength demultiplexing unit in the reception-side optical wavelength multiplexer has a plurality of ports to be connected to the optical wavelength converters. An input wavelength is previously set in each of the ports, and a wavelength to be converted is previously set in each of the optical wavelength converters connected to the corresponding port so as to be converted to the wavelength set in a destination port.

Accordingly, the transmission-side optical wavelength multiplexer receives the optical signals converted to the respective preset wavelengths, multiplexes the converted optical signals, and transmits the multiplexed optical signal. The reception-side optical wavelength multiplexer receives and demultiplexes the multiplexed optical signal into optical signals having the original wavelengths, to obtain the optical signals. Even when any one of the optical signals having a different wavelength from the wavelength set in the corresponding port is received, the transmission-side optical wavelength multiplexer multiplexes the optical signals including the improper optical signal, and transmits a multiplexed optical signal. However, when receiving and demultiplexing the multiplexed optical signal, the reception-side optical wavelength multiplexer cannot normally demultiplex the multiplexed optical signal.

Although the transmission-side optical wavelength multiplexer and the reception-side optical wavelength multiplexer are explained below as separate devices for convenience in an explanation in the embodiments, the present invention is not limited to such a configuration. Therefore, the reception-side optical wavelength multiplexer explained in the embodiments may transmit a multiplexed optical signal. In other words, it does not matter which is which, because the device that transmits a multiplexed optical signal is set as a transmission-side optical wavelength multiplexer while the device that receives the multiplexed optical signals is set as a reception-side optical wavelength multiplexer.

The "terminal device" indicates a device that transmits an optical signal to the optical wavelength multiplexing system and receives an optical signal therefrom. Specifically, the terminal device is connected to an optical wavelength converter that converts an optical signal into an arbitrary preset wavelength. The optical signal transmitted by the terminal device is converted into an arbitrary wavelength by the optical wavelength converter, and a converted optical signal is input into a corresponding port in the transmission-side optical wavelength multiplexer.

FIG. 1 is a schematic of an overview and characteristics of an optical wavelength multiplexing system according to a first embodiment.

As shown in FIG. 1, the optical wavelength multiplexing system includes the transmission-side optical wavelength multiplexer, the reception-side optical wavelength multiplexer, and terminal devices 1 to 3, which are connected to each other through optical fiber cables so as to enable communications with each other. In the transmission-side optical wavelength multiplexer, each of a plurality of optical wavelength converters converts an input optical signal into an arbitrary preset wavelength to generate a converted optical signal. The optical wavelength converters are connected to a plurality of ports whose predetermined wavelengths are set in advance, respectively.

Specifically, wavelengths $\lambda 1$ to $\lambda 3$ are set in a port A to a port C, respectively. The port A with the wavelength $\lambda 1$ set therein is connected to an optical wavelength converter that converts an input optical signal into an optical signal of the wavelength $\lambda 1$. The port B with the wavelength $\lambda 2$ set therein is connected to another optical wavelength converter that converts an input optical signal into the wavelength $\lambda 3$. In this case, although the port B is supposed to be connected to still another optical wavelength converter that converts an input optical signal into the wavelength $\lambda 2$, the optical wavelength converter that converts the optical signal into the wavelength $\lambda 3$ is incorrectly connected to the port B.

As explained above, the optical wavelength multiplexing system according to the first embodiment configured in the above manner multiplexes the converted optical signals generated by the optical wavelength converters, and generates and transmits the multiplexed optical signal. At the same time, the system demultiplexes the received multiplexed optical signal into the optical signals of the respective predetermined wavelengths. Particularly, this system has main characteristics such that an incorrect connection can be detected and the cost for constructing the system can be reduced.

The main characteristics will be more specifically explained below. The transmission-side optical wavelength multiplexer controls each of input units 1 to 3 so as not to input a converted optical signal into an optical multiplexer until the optical power level of the converted optical signal is detected. The optical wavelength converter in the transmission-side optical wavelength multiplexer receives the optical signal transmitted from the terminal device 1, converts the optical signal into an optical signal having the wavelength $\lambda 1$, and outputs the converted optical signal to the port A (see (1) and (2) of FIG. 1).

Optical power level detectors 1 to 3 in the transmission-side optical wavelength multiplexer detect the optical power levels of the converted optical signals input into the ports, respectively (see (3) of FIG. 1). Specifically, the optical power level detector 1 detects the optical power level of the converted optical signal having the wavelength $\lambda 1$ input into the port A.

Subsequently, when the optical power level of the converted optical signal is detected, the transmission-side optical wavelength multiplexer controls each of the input units 1 to 3 so as to input the converted optical signal into the optical multiplexer (see (4) of FIG. 1). Specifically, when the optical power level of the converted optical signal input into the port A is detected, an input controller in the transmission-side optical wavelength multiplexer controls the input unit 1 so as to input the converted optical signal into the optical multiplexer.

The transmission-side optical wavelength multiplexer inputs the converted optical signals input to the ports into the optical multiplexer, multiplexes all the converted optical signals input from the ports to generate a multiplexed optical signal (see (5) and (6) of FIG. 1). Specifically, the transmission-side optical wavelength multiplexer inputs the converted optical signal which is input into the port A and converted into the wavelength $\lambda 1$, into the optical multiplexer, and the optical multiplexer multiplexes all the input converted optical signals to generate and output a multiplexed optical signal to the transmission-light amplifying unit.

Thereafter, the transmission-side optical wavelength multiplexer branches the multiplexed optical signal, and detects optical power levels of the predetermined wavelengths set in the respective ports of the branched optical signal, from the branched multiplexed optical signal (see (7) and (8) of FIG. 1). Specifically, an optical branching unit in the transmission-side optical wavelength multiplexer branches the multiplexed optical signal, and an optical power level detector provided therein detects an optical power level of the wavelength $\lambda 1$ set in the port A of the branched optical signal, from the branched multiplexed optical signal.

The transmission-side optical wavelength multiplexer compares each detected optical power level of the converted wavelengths with each detected optical power level of the wavelengths of the branched optical signal. When a difference is detected in the comparison result, then the transmission-side optical wavelength multiplexer detects that a particular optical wavelength converter is incorrectly connected to a port because the optical wavelength converter converts the optical signal into a wavelength different from the predetermined wavelength set in the port (see (9) of FIG. 1).

Specifically, an incorrect connection detector in the transmission-side optical wavelength multiplexer compares an optical power level of the wavelength which is converted into the wavelength $\lambda 1$ and input into the port A with an optical power level of the wavelength $\lambda 1$ set in the port A, after branching the multiplexed optical signal multiplexed by the optical multiplexer, from the branched multiplexed optical signal. Subsequently, the transmission-side optical wavelength multiplexer determines that both detected optical signals, i.e., one optical signal having the optical power level of the converted wavelength and the other having the optical power level of the wavelength of the branched optical signal, are the same optical wavelengths converted into the wavelength $\lambda 1$. Based on this determination, the transmission-side optical wavelength multiplexer determines that there is no difference in the two optical power levels, and that the optical wavelength converter that converts the optical signal into the wavelength $\lambda 1$ is correctly connected to the port A in which the wavelength $\lambda 1$ is set.

Similarly to the method described above, when an optical signal is transmitted from the terminal device 2, the transmission-side optical wavelength multiplexer determines whether an optical wavelength converter connected to the terminal device 2 is connected to an improper port.

Specifically, the optical wavelength converter in the transmission-side optical wavelength multiplexer that receives the optical signal from the terminal device 2, converts the optical signal into an optical signal having a wavelength $\lambda 3$, and outputs the converted optical signal to the port B. The optical power level detector 2 detects the optical power level of a converted optical signal having the wavelength $\lambda 3$ input into the port B (see (10) to (12) of FIG. 1).

When the optical power level of the converted optical signal is detected, the transmission-side optical wavelength multiplexer controls the input unit 2 so as to input the converted optical signal into the optical multiplexer, inputs the converted optical signals input to the port A and the port B respectively into the optical multiplexer, and multiplexes all the converted optical signals input from the port A and the port B to generate a multiplexed optical signal. The transmission-side optical wavelength multiplexer branches the multiplexed optical signal, and detects the optical power level of the wavelength $\lambda 2$ set in the port B, from the branched optical signal (see (13) to (17) of FIG. 1).

The incorrect connection detector in the transmission-side optical wavelength multiplexer compares the detected optical power level after conversion with the detected optical power level after branching. When a difference is detected in the comparison result, the incorrect connection detector detects that an optical wavelength converter is incorrectly connected to the port B because the optical wavelength converter converts the optical wavelength into a wavelength different from the wavelength $\lambda 2$ set in the port B (see (18) of FIG. 1).

Specifically, the incorrect connection detector compares the optical-power level of the wavelength which is converted into the wavelength $\lambda 3$ and input into the port B, with the optical power level of the wavelength $\lambda 2$ set in the port B, from the branched multiplexed optical signal. The incorrect connection detector detects that the optical power levels show a difference in wavelength, and thereby detects the difference in the both optical power levels. Then, the incorrect connection detector detects that the optical wavelength converter which converts the optical signal into a wavelength different from the wavelength $\lambda 2$ set in the port B is incorrectly connected to the port B.

In the example described above, the case where the incorrect connection is detected from the optical signal in-put into the port A, and then detected from the optical signal input into the port B is explained. However, the present invention is not limited to this configuration, and may be configured that the incorrect connections are detected from the optical signals simultaneously input into the port A and the port B.

As explained above, in the optical wavelength multiplexing system according to the first embodiment, the optical wavelength converters convert input optical signals into arbitrary preset wavelengths to generate converted optical signals respectively, and the optical wavelength converters are connected to the ports in which respective predetermined wavelengths are preset. The incorrect connection can be detected in the above manner when the converted optical signals are multiplexed to generate and transmit a multiplexed optical signal, and the cost for constructing the system can be reduced.

FIG. 2 is a block diagram of the configuration of the optical wavelength multiplexing system according to the first embodiment. As shown in FIG. 2, the optical wavelength multiplexing system includes a transmission-side optical wavelength multiplexer 10 and a reception-side optical wavelength multiplexer 70.

The transmission-side optical wavelength multiplexer 10 includes a memory unit 11, optical wavelength converters 12 to 14, an optical wavelength multiplexing unit 20, a transmission-light amplifying unit 40, an optical spectrum monitor 50, and an optical-level monitoring controller 60.

The memory unit 11 stores therein wavelengths set in a port A 21 to a port C 23 which will be explained later. Specifically, as shown in FIG. 3, the memory unit 11 stores therein "Port A, $\lambda 1$", "Port B, $\lambda 2$", "Port C, $\lambda 3$", and so on as to indicate "a port number specifying a port and a wavelength showing a wavelength to be set". FIG. 3 is a diagram of an example of information stored in the memory unit.

Each of the optical wavelength converters 12 to 14 converts an input optical signal into an arbitrary wavelength which is set in advance. Specifically, $\lambda 1$, $\lambda 2$, and the like are set, in advance by a user, in the optical wavelength converters 12 to 14 as wavelengths to be converted respectively, and the optical wavelength converters 12 to 14 convert the input optical signals into optical signals having the preset wavelengths such as $\lambda 1$, $\lambda 2$, and the like, respectively. As one example, the wavelength $\lambda 1$ is set in the optical wavelength converter 12, the wavelength $\lambda 3$ is set in the optical wavelength converter 13, and the wavelength $\lambda 2$ is set in the optical wavelength converter 14.

The optical wavelength multiplexing unit 20 includes the ports A 21 to C 23, photodetectors (PD) 24 to 26, optical switches 27 to 29, and an optical coupler (CPL) 30 as elements closely related to the present invention in particular. The optical wavelength multiplexing unit 20 performs various controls so as to multiplex the converted optical signals input into the ports from the optical wavelength converters 12 to 14 respectively, generate a multiplexed optical signal, and transmit the generated multiplexed optical signal to the transmission-light amplifying unit 40 to be explained later.

Predetermined wavelengths are set in advance and converted optical signals converted by the optical wavelength converters 12 to 14 are input in the port A 21 to port C 23, respectively, and the converted optical signals are output to the PD 24 to PD 26 to be explained later, respectively. Specifically, the optical wavelength converter 12 with the wavelength $\lambda 1$ set therein and the PD 24 are connected to the port A 21, the optical wavelength converter 13 with the wavelength $\lambda 3$ set therein and the PD 25 are connected to the port B 22, and the optical wavelength converter 14 with the wavelength $\lambda 2$ set therein and the PD 26 are connected to the port C 23. An optical signal converted into the wavelength $\lambda 1$ by the optical wavelength converter 12 is input into the port A 21, and the converted optical signal is output to the PD 24. Similarly, an optical signal converted into the wavelength $\lambda 3$ by the optical wavelength converter 13 is input into the port B 22, and the converted optical signal is output to the PD 25. An optical signal converted into the wavelength $\lambda 2$ by the optical wavelength converter 14 is input into the port C 23, and the converted optical signal is output to the PD 26.

Although the case where three ports such as the port A 21 to port C 23 are provided is explained, the present invention is not limited to this configuration. Therefore, four ports may be provided, and thus there is no limitation in the number of the ports. Furthermore, optical wavelength converters of the same number as the ports may be connected to the ports respectively, or one optical wavelength converter may be connected to a plurality of ports. When one optical wavelength converter is connected to a plurality of ports, because different wavelengths are set in the ports, the optical wavelength converter is caused to set a plurality of optical wavelengths therein, converts optical signals into different wavelengths, and inputs the converted optical signals into the ports, respectively.

The PD 24 to PD 26 are circuits such as large scale integration (LSI) which are connected to the ports respectively and detect optical power levels of the converted optical signals input into the ports respectively. Specifically, the PD 24 is connected to the port A 21, receives the optical signal converted into the wavelength λ1 by the optical wavelength converter 12 from the port A 21, detects the optical power level of the input converted optical signal, and informs the optical-level monitoring controller 60 to be explained later of the detected optical power level. Similarly, the PD 25 is connected to the port B 22, receives the optical signal converted into the wavelength λ3 by the optical wavelength converter 13 from the port B 22, detects the optical power level of the input converted optical signal, and informs the optical-level monitoring controller 60 of the detected optical power level. The PD 26 is connected to the port C 23, receives the optical signal converted into the wavelength λ2 by the optical wavelength converter 14 from the port C 23, detects the optical power level of the input converted optical signal, and informs the optical-level monitoring controller 60 of the detected optical power level. It should be noted that the PD 24 to PD 26 correspond to "first optical-power-level detector" in claims.

The optical switches 27 to 29 input the converted optical signals input into the ports respectively, into the optical coupler 30 to be explained later. Specifically, when the optical-level monitoring controller 60 to be explained later controls the optical switch 27 so as to input the converted optical signal into the optical coupler 30, the optical switch 27 inputs the optical signal which is converted into the wavelength λ1 and input from the PD 24, into the optical coupler 30. Similarly, the optical switch 28 inputs the optical signal which is converted into the wavelength λ3 and input from the PD 25, into the optical coupler 30. The optical switch 29 inputs the optical signal which is converted into the wavelength λ2 and input from the PD 26, into the optical coupler 30.

Here, because the wavelength λ2 is set in the port B 22, the optical signal converted into the wavelength λ2 is supposed to be input into the optical switch 28 via the PD 25 in a normal situation. However, in this example, the optical wavelength converter 13 that converts the optical signal into the wavelength λ3 is connected to the port B 22, which results in the case where the optical signal converted into the wavelength λ3 is input into the optical switch 28. Despite this fact, the optical switches 27 to 29, which only have a function of transmitting optical signals, inputs the converted optical signals into the optical coupler 30 even if any one of the optical signals is converted into an erroneous wavelength. Although the case where three optical switches are provided is explained in the present example, the present invention is not limited to this configuration, and thus, the optical wavelength multiplexing system has optical switches of the same number as the ports. It should be noted that the optical switches 27 to 29 correspond to "input units" in claims.

The optical coupler 30 multiplexes all the converted optical signals input from a plurality of ports to generate a multiplexed optical signal. Specifically, when receiving the optical signals which are converted into the wavelengths λ1 to λ3 and input from the port A 21 to port C 23 via the optical switches 27 to 29 respectively, the optical coupler 30 multiplexes all the input converted optical signals, and outputs the multiplexed optical signal to the transmission-light amplifying unit 40 to be explained later. Even when the optical signal converted into a wavelength different from the wavelength set in each of the ports is input into the optical coupler 30, the optical coupler 30 multiplexes all the input converted optical signals and outputs the multiplexed optical signal to the transmission-light amplifying unit 40. It should be noted that the optical coupler 30 corresponds to "optical signal multiplexer" in claims.

The transmission-light amplifying unit 40 includes a PD 41, an optical branching unit 42, and an optical amplifier 43 as elements closely related to the present invention in particular. The transmission-light amplifying unit 40 amplifies the multiplexed optical signal input into the PD 41 and transmits the amplified optical signal to the reception-side optical wavelength multiplexer 70. The PD 41 is a circuit such as an LSI that outputs the multiplexed optical signal output from the optical wavelength multiplexing unit 20 to the optical branching unit 42 to be explained later. Specifically, the PD 41 receives the multiplexed optical signal output from the optical coupler 30 in the optical wavelength multiplexing unit 20 and outputs the multiplexed optical signal to the optical branching unit 42.

The optical branching unit 42 branches the multiplexed optical signal multiplexed by the optical coupler 30. Specifically, the optical branching unit 42 receives the multiplexed optical signal via the PD 41, branches the multiplexed optical signal into the optical spectrum monitor 50 and the optical amplifier 43 to be explained later, and outputs the multiplexed optical signal to both of them respectively. It should be noted that the optical branching unit 42 corresponds to "optical branching unit" in claims.

The optical amplifier 43 amplifies the multiplexed optical signal to an optical level at which the multiplexed optical signal can be transmitted, and transmits the amplified optical signal to the reception-side optical wavelength multiplexer 70. Specifically, the optical level of the input multiplexed optical signal after being branched by the optical branching unit 42 is degraded to about one half thereof, and the signal cannot be transmitted. Therefore, the optical amplifier 43 amplifies the multiplexed optical signal, branched and input by the optical branching unit 42 to an optical level at which it can be transmitted (e.g., to about twice of the input level), and transmits the amplified optical signal to the reception-side optical wavelength multiplexer 70.

The optical spectrum monitor 50 detects each optical power level of the predetermined wavelengths set in the ports, from the multiplexed optical signal branched by the optical branching unit 42. Specifically, the optical spectrum monitor 50 detects the optical power level of the wavelength λ1 set in the port A 21 from the multiplexed optical signal branched by the optical branching unit 42, and transmits the detected optical power level to the optical-level monitoring controller 60 to be explained later. Similarly, the optical spectrum monitor 50 detects the optical power level of the wavelength λ2 set in the port B 22 after the multiplex, and transmits the detected optical power level to the optical-level monitoring controller 60. The optical spectrum monitor 50 detects the optical power level of the wavelength λ3 set in the port C 23 after the multiplex, and transmits the detected optical power level to the optical-level monitoring controller 60. It should be noted that the optical spectrum monitor 50 correspond to "second optical-power-level detector" in claims.

The optical-level monitoring controller 60 controls the optical switches 27 to 29 so as not to input the converted optical signals into the optical coupler 30 until optical power levels of the converted wavelengths are detected by the PD 24 to PD 26, respectively. When each optical power level of the converted wavelengths is detected by the PD 24 to PD 26, the optical-level monitoring controller 60 controls the optical switches 27 to 29 so as to input the converted optical signals into the optical coupler 30. Then, the optical-level monitoring controller 60 compares each optical power level of the converted wavelengths detected by the PD 24 to PD 26 with each optical power level of the wavelengths of the branched optical signal detected by the optical spectrum monitor 50. When a difference is detected in the comparison result, the optical-level monitoring controller 60 detects that an optical wavelength converter is incorrectly connected to a port because the optical wavelength converter converts the wavelength into a wavelength different from the predetermined wavelength set in the port.

Specifically, the optical-level monitoring controller 60 stops the optical switches 27 to 29 so as not to input the converted optical signals into the optical coupler 30 until the PD 24 to PD 26 detect the optical power levels of the converted wavelengths respectively. When the optical power levels of the converted wavelengths are detected by the PD 24 to PD 26 respectively, the optical-level monitoring controller 60 controls the optical switches 27 to 29 so as to input the converted optical signals into the optical coupler 30.

The optical-level monitoring controller 60 compares the optical power level of the wavelength $\lambda 1$ detected by the PD 24 after the conversion, with the optical power level of the wavelength $\lambda 1$ set in the port A 21 of the branched optical signal, detected by the optical spectrum monitor 50. As a result of the comparison, both of the optical power levels are detected as those of optical wavelengths converted into the wavelength $\lambda 1$, which indicates there is no difference between the two optical power levels. Therefore, it is determined that the optical wavelength converter is correctly connected to the port A 21 with the wavelength $\lambda 1$ set therein because the converter converts the optical signal into the wavelength $\lambda 1$.

The optical-level monitoring controller 60 also compares the optical power level of the wavelength $\lambda 3$ detected by the PD 25 after the conversion, with the optical power level of the wavelength $\lambda 2$ set in the port B 22 of the branched optical signal, detected by the optical spectrum monitor 50. As a result of the comparison, the optical power levels are detected as those of different wavelengths, and a difference is detected from both of the optical power levels. Thus it is determined that the optical wavelength converter is incorrectly connected to the port B 22 because the converter converts the optical signal to a wavelength different from the wavelength $\lambda 2$ set in the port B 22.

Similarly, the optical-level monitoring controller 60 compares the optical power level of the wavelength $\lambda 2$ detected by the PD 26 after the conversion, with the optical power level of the wavelength $\lambda 3$ set in the port C 23 of the branched optical signal, detected by the optical spectrum monitor 50. As a result of the comparison, the optical power levels are detected as those of different wavelengths, and a difference is detected from both of the optical power levels. Thus it is determined that the optical wavelength converter is incorrectly connected to the port C 23 because the converter converts the optical signal to a wavelength different from the wavelength $\lambda 3$ set in the port C 23. It should be noted that the optical-level monitoring controller 60 corresponds to "input controller" and "incorrect connection detector" in claims.

The reception-side optical wavelength multiplexer 70 includes a memory unit 71, a received-light amplifying unit 72, an optical wavelength demultiplexing unit 74, optical wavelength converters 82 to 84, and an optical level monitor 85. Similarly to the memory unit 11 in the transmission-side optical wavelength multiplexer 10, the memory unit 71 stores therein wavelengths set in the port A 21 to the port C 23 in the transmission-side optical wavelength multiplexer 10 as wavelengths set in a port A 79 to a port C 81 to be explained later.

Specifically, the memory unit 71 stores therein "port A, $\lambda 1$", "port B, $\lambda 2$", "port C, $\lambda 3$", and so on (see FIG. 3).

The received-light amplifying unit 72 includes an optical amplifier 73 as an element closely related to the present invention in particular, and amplifies a received multiplexed optical signal. The optical amplifier 73 amplifies a degraded multiplexed optical signal. Specifically, because the optical power level of the multiplexed optical signal is degraded during the transmission from the transmission-side optical wavelength multiplexer 10, the optical amplifier 73 amplifies the optical power level to recover the multiplexed optical signal.

The optical wavelength demultiplexing unit 74 controls so as to demultiplex the received multiplexed optical signal. The optical wavelength demultiplexing unit 74 includes a received-light wavelength demultiplexer (AWG) 75, PDs 76 to 78, and the port A 79 to port C 81 as elements closely related to the present invention in particular. The received-light wavelength demultiplexer 75 demultiplexes the multiplexed optical signal into the original wavelengths. Specifically, when the multiplexed optical signal transmitted from the transmission-side optical wavelength multiplexer 10 is amplified by the received-light amplifying unit 72 and is input into the received-light wavelength demultiplexer 75, the received-light wavelength demultiplexer 75 demultiplexes the multiplexed optical signal, to obtain the optical signals having the wavelengths $\lambda 1$ to $\lambda 3$ (which are stored in the memory unit 11) set in the port A 21 to the port C 23 respectively in the transmission-side optical wavelength multiplexer 10.

The PDs 76 to 78 are circuits such as LSIs that are connected to a plurality of ports respectively and detect the optical power levels of demultiplexed optical signals respectively. Specifically, when the multiplexed optical signal is demultiplexed by the received-light wavelength demultiplexer 75 and the demultiplexed optical signals having the wavelengths $\lambda 1$ to $\lambda 3$ are obtained, each of the PDs 76 to 78 detects each optical power level of the demultiplexed optical signals and outputs the detected optical power level to the optical level monitor 85 to be explained later.

The port A 79 to port C 81 have respective predetermined wavelengths preset therein, and receive the demultiplexed optical signals demultiplexed by the received-light wavelength demultiplexer 75, and output the demultiplexed optical signals to the optical wavelength converters 82 to 84 to be explained later, respectively. Specifically, the wavelength $\lambda 1$ which is the same as that of the port A 21 in the transmission-side optical wavelength multiplexer 10 is set in the port A 79. The port A 79 receives the demultiplexed optical signal of the wavelength $\lambda 1$ demultiplexed by the received-light wavelength demultiplexer 75 via the PD 76, and outputs the demultiplexed optical signal of the wavelength $\lambda 1$ to the optical wavelength converter 82 connected to the port A 79.

The wavelength $\lambda 2$ which is the same as that of the port B 22 in the transmission-side optical wavelength multiplexer 10 is set in the port B 80. The port B 80 receives the demultiplexed optical signal of the wavelength $\lambda 2$ demultiplexed by the received-light wavelength demultiplexer 75 via the PD 77, and outputs the demultiplexed optical signal of the wavelength $\lambda 2$ to the optical wavelength converter 83 connected to the port B 80. In this case, the optical signal of the wavelength $\lambda 2$ is generated by the optical wavelength converter 14 connected to the port C 23 in the transmission side, but it is received by the PD 77 connected to the port B 80 in the reception side. Thus, the optical wavelength converter 13 is incorrectly connected to the port B 22 in the transmission side, which results in an erroneous reception of the optical signal in the reception side.

The optical wavelength converters 82 to 84 convert the demultiplexed optical signals into the optical signals having the original wavelengths respectively. Specifically, the optical wavelength converter 82 converts the demultiplexed optical signal of the wavelength λ1 input into the port A 79, into the original wavelength which the terminal device 1 has transmitted, and outputs the optical signal to the terminal device 1 as a destination. The port B 22 with the wavelength λ2 set therein is connected to the incorrect optical wavelength converter 13 (which converts the optical signal into the wavelength λ3), and therefore, the wavelength λ2 transmitted from the terminal device 3 is input into the port B 80 in the reception side although the terminal device 2 in the transmission side transmits the data to the terminal device 2 as a destination. Thus, the optical wavelength converter 83 converts the demultiplexed optical signal having the wavelength λ2 into the original optical signal, and transmits the converted optical signal to the terminal device 2 as a destination. In the same manner as above, the optical signal having the wavelength λ3 transmitted from the terminal device 2 is transmitted to the terminal device 3 as a destination.

The optical level monitor 85 temporarily stores therein and monitors the optical power levels detected by the PDs 76 to 78. Specifically, when the optical power levels of the demultiplexed optical signals demultiplexed by the received-light wavelength demultiplexer 75 are detected by the PDs 76 to 78 and informed respectively, the optical level monitor 85 temporarily stores therein and monitors the detected optical power levels.

FIG. 4 is a flowchart of a process of detecting the incorrect connection in the optical wavelength multiplexing system according to the first embodiment.

As shown in FIG. 4, in the transmission-side optical wavelength multiplexer 10, when the PD 24 to PD 26 detect the optical power levels of the converted optical signals input into the ports respectively (step S401), the optical-level monitoring controller 60 controls, respectively, the optical switches 27 to 29 connected to the corresponding ports where the optical power levels are detected so as to input the converted optical signals into the optical coupler 30 (step S402).

The optical coupler 30 multiplexes all the input converted optical signals (step S403), and the optical branching unit 42 branches the multiplexed optical signal into the optical spectrum monitor 50 and the optical amplifier 43 (step S404).

The optical spectrum monitor 50 detects each optical power level of the predetermined wavelengths set in the respective ports from the branched optical signal (step S405).

Subsequently, the optical-level monitoring controller 60 compares each optical power level of the converted wavelengths detected by the PD 24 to PD 26 respectively with each optical power level of the wavelengths of the branched optical signal detected by the optical spectrum monitor 50 (step S406), and determines whether there is a difference between the optical power levels (step S407).

When it is determined that there is a difference between the two levels ("YES" at step S407), the optical-level monitoring controller 60 detects that any one of the optical wavelength converters is incorrectly connected to a port because the optical wavelength converter converts the optical signal into a wavelength different from the predetermined wavelength set in the port (step S408). When there is no difference between the two levels, it is determined that there is no incorrect connection between the optical wavelength converter and the port, and the process is ended.

Effects of the first embodiment will be described next. According to the first embodiment, the plurality of PDs are connected to the ports respectively, each optical power level of the converted optical signals input into the ports is detected, all the input converted optical signals are multiplexed to generate a multiplexed optical signal, a plurality of input units are provided to the ports, the converted optical signals input into the ports are input into the PDs, and the optical-level monitoring controller controls the optical switches so as not to input the converted optical signals into the optical coupler until the optical power levels of the converted wavelengths are detected and so as to input the converted optical signals into the optical coupler when the optical power levels of the converted wavelengths are detected.

Each optical power level of the predetermined wavelengths set in the ports after being multiplexed is detected, and each detected optical power level of the converted wavelengths is compared with each detected optical power level of the wavelengths after being multiplexed. When there is a difference between the two levels, it is detected that any one of the optical wavelength converters is incorrectly connected to a port because the optical wavelength converter converts the optical signal to a wavelength different from the predetermined wavelength set in the port. Thus, it is possible to detect an incorrect connection and also reduce the cost for constructing the system.

For example, by using the optical switches as input units and using the optical coupler (CPL) as an optical signal multiplexer, the incorrect connection in each port can be detected. Consequently, the cost for constructing the system can be reduced as compared with the case where an expensive arrayed waveguide grating (AWG) is employed to detect the incorrect connection. Moreover, it is possible to reconnect an incorrectly connected optical fiber cable to a proper destination and to change the setting of a port according to a wavelength transmitted over an optical fiber cable, without stopping the system.

According to the first embodiment, the multiplexed optical signal is branched, and each optical power level of the predetermined wavelengths set in the ports after being multiplexed is detected from the branched multiplexed optical signal. Each detected optical power level of the converted wavelengths is compared with each detected optical power level of the wavelengths of the branched optical signal. When there is a difference in the comparison result, it is detected that a particular optical wavelength converter is incorrectly connected to a port because the optical wavelength converter converts the optical signal into a wavelength different from the predetermined wavelength set in the port. Therefore, the incorrect connection can be detected in the transmission side of the optical wavelength multiplexing system, which allows further reduction in the cost for constructing the system.

For example, when the optical switches are used as the input units and the optical coupler (CPL) is used as the optical signal multiplexer, an optical signal having an incorrect wavelength due to the incorrect connection is also multiplexed in a multiplexed optical signal. Therefore, before the multiplexed optical signal is transmitted, the incorrect connection is detected in the transmission side of the optical wavelength multiplexing system, which allows reduction in the cost for constructing the system and prevention of degradation in quality of the multiplexed optical signal and the optical wavelength multiplexing system.

In the first embodiment, the case where the incorrect connection is detected by comparing the optical power level of the converted optical signal detected by the PD with that of the branched optical signal obtained by multiplexing optical signals and branching the multiplexed optical signal is explained. However, the present invention is not limited to this configuration. Thus, the comparison may be made between the optical power level of the converted optical signal detected by the PD and the optical power level of a demultiplexed optical signal obtained by multiplexing the optical signals, branching the multiplexed optical signal, and further demultiplexing the branched optical signal into optical signals.

In a second embodiment, a case where the incorrect connection is determined by comparing optical power levels is explained with reference to FIG. 5. Specifically, the optical power level of the converted optical signal detected by the PD is compared with the optical power level of the demultiplexed optical signal.

Figure 5:
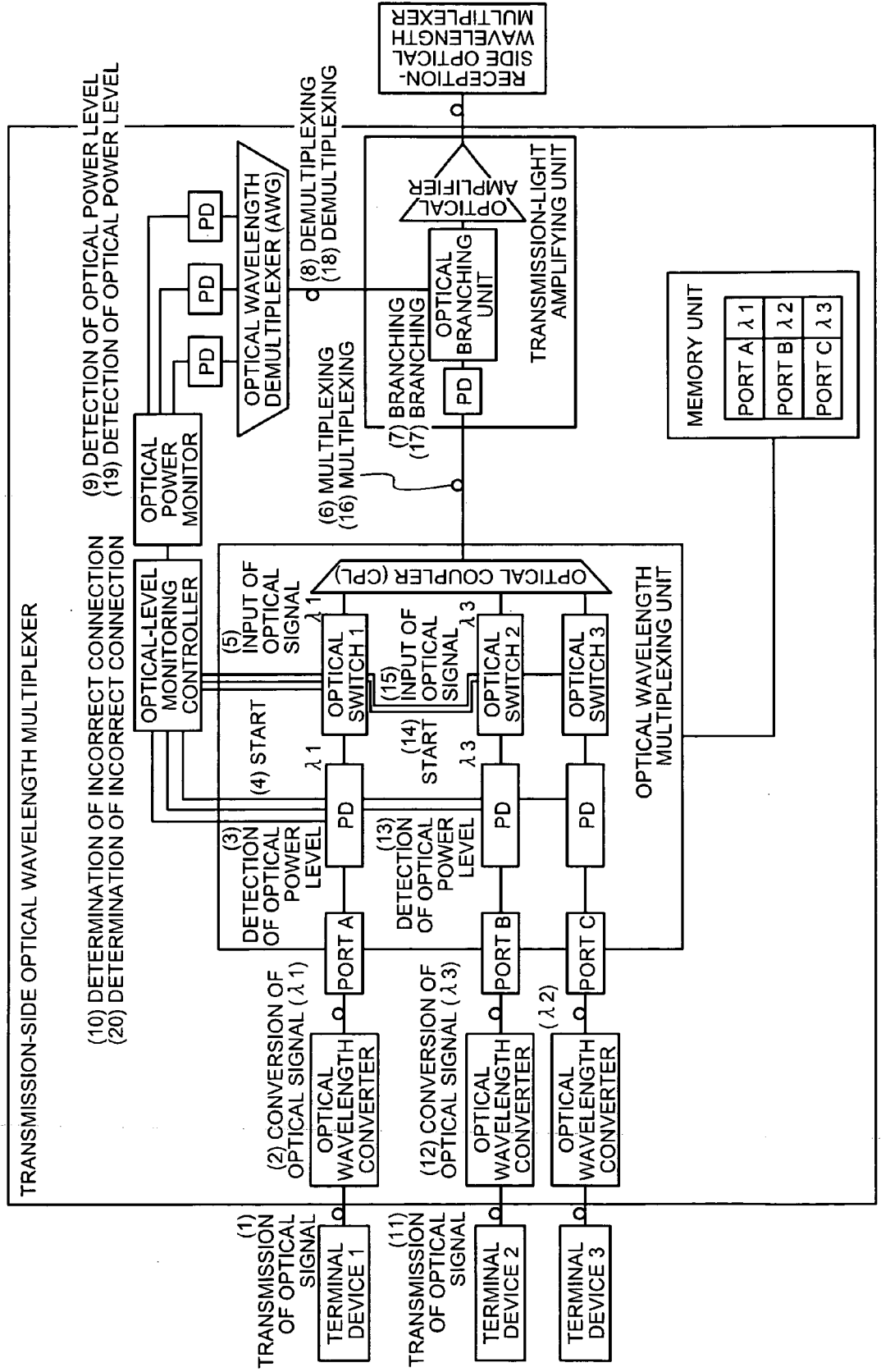
FIG. 5 is a schematic of an overall configuration of an optical wavelength multiplexing system according to a second embodiment.

FIG. 5 is a schematic of an overall configuration of an optical wavelength multiplexing system according to the second embodiment.

Similarly to FIG. 1 according to the first embodiment, as shown in FIG. 5, the optical wavelength multiplexing system according to the second embodiment includes a transmission-side optical wavelength multiplexer, a reception-side optical wavelength multiplexer, and terminal devices, which are connected to each other by optical fiber cables so as to enable mutual communication with each other. In the transmission-side optical wavelength multiplexer, a plurality of optical wavelength converters each of which converts an input optical signal into an arbitrary preset wavelength to generate a converted optical signal are connected to a plurality of ports (port A to port C) in which predetermined wavelengths are preset respectively.

Specifically, similarly to the first embodiment, wavelengths $\lambda 1$ to $\lambda 3$ are set in the port A to port C respectively. The port A with the wavelength $\lambda 1$ set therein is connected to an optical wavelength converter that converts an input optical signal into an optical signal of the wavelength $\lambda 1$. The port B with the wavelength $\lambda 2$ set therein is connected to another optical wavelength converter that converts an input optical signal into the wavelength $\lambda 3$. The port C with the wavelength $\lambda 3$ set therein is connected to still another optical wavelength converter that converts an input optical signal into the wavelength $\lambda 2$. In other words, the optical wavelength converters that convert input optical signals into wavelengths different from the wavelengths set in the connected ports are connected to the port B and the port C, respectively.

With such a configuration, the transmission-side optical wavelength multiplexer controls each of optical switches 1 to 3 so as not to input a converted optical signal into an optical coupler until the optical power level of the converted wavelength is detected. Specifically, the optical wavelength converter in the transmission-side optical wavelength multiplexer receives the optical signal transmitted from a terminal device 1, converts the optical signal to an optical signal having the wavelength $\lambda 1$, and outputs the converted optical signal to the port A (see (1) and (2) of FIG. 5).

In the transmission-side optical wavelength multiplexer, a plurality of PDs connected to the ports detect the optical power levels of the converted optical signals input into the ports respectively (see (3) of FIG. 5). Specifically, the transmission-side optical wavelength multiplexer detects the optical power level of the converted optical signal having the wavelength $\lambda 1$ input into the port A.

Subsequently, when the optical power levels of the converted wavelengths are detected, the transmission-side optical wavelength multiplexer controls the optical switches 1 to 3 so as to input the converted optical signals into the optical coupler (see (4) of FIG. 5). Specifically, when the optical power level of the converted wavelength input into the port A is detected, the transmission-side optical wavelength multiplexer controls the optical switch 1 so as to input the converted optical signal into the optical coupler.

The transmission-side optical wavelength multiplexer inputs the converted optical signals input to the ports into the optical coupler, and multiplexes all the converted optical signals input from the ports to generate a multiplexed optical signal (see (5) and (6) of FIG. 5). Specifically, the transmission-side optical wavelength multiplexer inputs the converted optical signal having the wavelength $\lambda 1$ input to the port A into the optical coupler, causes the optical coupler to multiplex all the input converted optical signals to generate a multiplexed optical signal, and outputs the multiplexed optical signal to the transmission-light amplifying unit.

Thereafter, the transmission-side optical wavelength multiplexer branches the multiplexed optical signal, causes an optical wavelength demultiplexer (AWG) to demultiplex the branched multiplexed optical signal into optical signals of predetermined wavelengths set in the respective ports, and detects each optical power level of the demultiplexed wavelengths (see (7) to (9) of FIG. 5). Specifically, the transmission-side optical wavelength multiplexer branches the multiplexed optical signal multiplexed by the optical coupler, causes the optical wavelength demultiplexer to demultiplex the branched multiplexed optical signal into wavelengths including the wavelength $\lambda 1$ set in the port A, and detects an optical power level of the demultiplexed wavelength $\lambda 1$.

The transmission-side optical wavelength multiplexer compares the detected optical power level of the converted with the detected optical power level of the demultiplexed wavelength. When there is a difference in the comparison result, the transmission-side optical wavelength multiplexer detects that the optical wavelength converter is incorrectly connected to the port because the optical wavelength converter converts the optical signal into a wavelength different from the predetermined wavelength set in the port (see (10) of FIG. 5).

Specifically, the transmission-side optical wavelength multiplexer compares the optical power level of the converted wavelength $\lambda 1$ input into the port A with the optical power level of the demultiplexed wavelength $\lambda 1$ set in the port A obtained after the multiplexed optical signal is branched and the wavelength $\lambda 1$ set in the port A is demultiplexed from the branched multiplexed optical signal. Subsequently, when the optical signal having the detected optical power level of the converted wavelength and the optical signal having the detected optical power level of the demultiplexed wavelength are determined to be those converted into the wavelength $\lambda 1$, the transmission-side optical wavelength multiplexer determines that there is no difference between the two optical power levels and the optical wavelength converter which converts the optical signal to the wavelength $\lambda 1$ is correctly connected to the port A with the wavelength $\lambda 1$ set therein.

Similarly to the method described above, when an optical signal is transmitted from the terminal device 2, the transmission-side optical wavelength multiplexer determines whether an optical wavelength converter connected to the terminal device 2 is connected to an improper port.

Specifically, the optical wavelength converter in the transmission-side optical wavelength multiplexer receives an optical signal from the terminal device 2, converts the optical signal into an optical signal having the wavelength $\lambda 3$, and outputs the converted optical signal to the port B, and the optical power level of the converted optical signal having the wavelength $\lambda 3$ input into the port B is detected (see (11) to (13) of FIG. 5).

Thereafter, when the optical power level of the converted wavelength is detected, the transmission-side optical wavelength multiplexer controls the optical switch 2 so as to input the converted optical signal into the optical coupler, inputs the converted optical signals input to the port A and the port B into the optical coupler, and multiplexes all the converted optical signals input from the port A and the port B to generate a multiplexed optical signal. The transmission-side optical wavelength multiplexer then branches the multiplexed optical signal, demultiplexes the branched multiplexed optical signal into optical signals having the wavelengths $\lambda 1$ and $\lambda 2$ which are set in the port A and the port B respectively, and detects the optical power levels of the demultiplexed optical signals (see (14) to (19) of FIG. 5).

The transmission-side optical wavelength multiplexer compares the detected optical power level of the converted optical signal with the detected optical power level of the demultiplexed optical signal. When there is a difference in the comparison result, the transmission-side optical wavelength multiplexer detects that the optical wavelength converter is incorrectly connected to the port B because the optical wavelength converter converts the optical signal into a wavelength different from the wavelength $\lambda 2$ set in the port B (see (20) of FIG. 5).

Specifically, the transmission-side optical wavelength multiplexer compares the optical power level of the wavelength $\lambda 3$ input into the port B after being converted thereto with the optical power level of a demultiplexed wavelength $\lambda 2$ obtained after the multiplexed optical signal multiplexed by the optical coupler is branched and the optical signal having the wavelength $\lambda 2$ set in the port B is demultiplexed from the branched multiplexed optical signal. Consequently, the optical power levels of different wavelengths are detected, and it is thereby determined that there is a difference between the two optical power levels. Thus it is detected that the optical wavelength converter which converts the optical signal into a wavelength different from the wavelength $\lambda 2$ set in the port B is incorrectly connected to the port B.

As explained above, the optical wavelength multiplexing system according to the second embodiment braches the multiplexed optical signal, demultiplexes the branched multiplexed optical signal into optical signals of the predetermined wavelengths set in the ports respectively, and detects each optical power level of the demultiplexed predetermined wavelengths set in the ports, from the demultiplexed optical signals. The system compares each detected optical power level of the converted wavelengths with each optical power level of the demultiplexed wavelengths. When there is a difference in the comparison result, it is detected that the optical wavelength converter that converts the optical signal into a wavelength different from the predetermined wavelength set in a port is incorrectly connected to the port. Thus, the incorrect connection can be detected and the cost can be further reduced.

By using an arrayed waveguide grating (AWG) as an optical wavelength demultiplexer which is more inexpensive than the optical spectrum monitor instead of using the optical spectrum monitor which is very expensive as the optical branching unit, the cost for constructing the system can further be reduced.

In the first embodiment, the case where the incorrect connection is detected by comparing the optical power level of the converted optical signal detected by the PD with that of the branched optical signal obtained by multiplexing optical signals and then branching the multiplexed optical signal is explained. However, the present invention is not limited to this configuration, and thus, comparison may be made between the optical power level of the converted optical signal detected by the PD and the optical power level of the multiplexed optical signal after being received.

In a third embodiment, a case where the incorrect connection is determined by comparing an optical power level of a converted optical signal detected by a PD with an optical power level of a received multiplexed optical signal will be explained with reference to FIG. 6.

Figure 6:
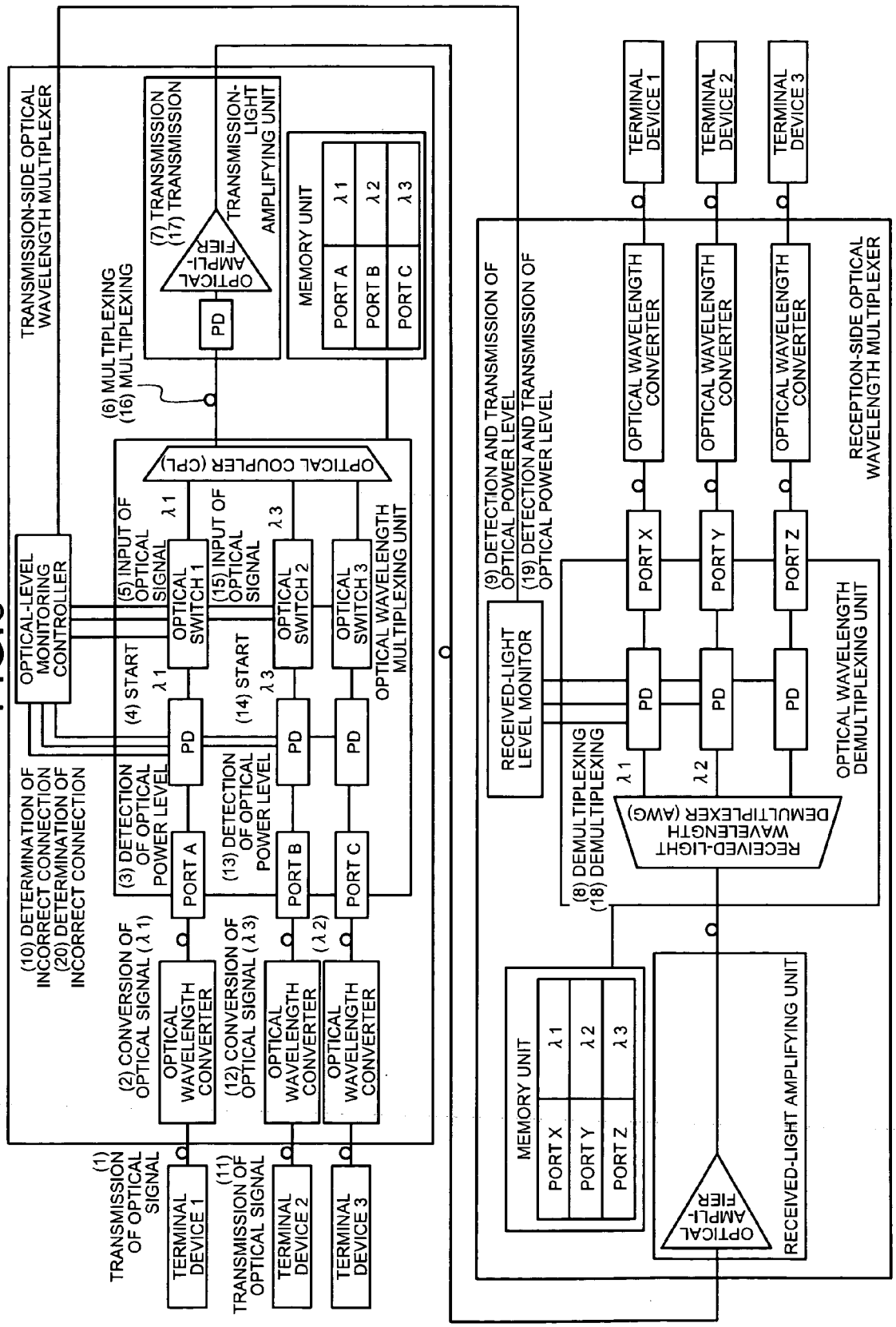
FIG. 6 is a schematic of an overall configuration of an optical wavelength multiplexing system according to a third embodiment.

FIG. 6 is a schematic of an overall configuration of an optical wavelength multiplexing system according to the third embodiment.

As shown in FIG. 6, similarly to FIG. 1 according to the first embodiment, the optical wavelength multiplexing system according to the third embodiment includes a transmission-side optical wavelength multiplexer, a reception-side optical wavelength multiplexer, and terminal devices, which are connected to each other by optical fiber cables so as to enable mutual communication with each other. In the transmission-side optical wavelength multiplexer, a plurality of optical wavelength converters each of which converts an input optical signal into an arbitrary preset wavelength to generate a converted optical signal are connected to a plurality of ports (port A to port C) in which predetermined wavelengths are preset respectively.

Specifically, similarly to the first embodiment, wavelengths $\lambda 1$ to $\lambda 3$ are set in the port A to port C respectively. The port A with the wavelength $\lambda 1$ set therein is connected to an optical wavelength converter that converts an input optical signal into an optical signal of the wavelength $\lambda 1$. The port B with the wavelength $\lambda 2$ set therein is connected to another optical wavelength converter that converts an input optical signal into the wavelength $\lambda 3$. The port C with the wavelength $\lambda 3$ set therein is connected to still another optical wavelength converter that converts an input optical signal into the wavelength $\lambda 2$. In other words, the optical wavelength converters that convert input optical signals into wavelengths different from the wavelengths set in the connected ports are connected to the port B and the port C, respectively.

Settings similar to the port A to port C in the transmission-side optical wavelength multiplexer are provided in a port X to a port Z in the reception-side optical wavelength multiplexer, and optical wavelength converters that convert the optical signals into the original wavelengths are connected to the ports respectively. Specifically, the wavelength $\lambda 1$ is set in the port X, the wavelength $\lambda 2$ is set in the port Y, and the wavelength $\lambda 3$ is set in the port Z. The port X to the port Z are connected to optical wavelength converters that convert received optical signals into wavelengths used in terminal devices 1 to 3 that transmit data (optical signals), respectively.

With such a configuration, the transmission-side optical wavelength multiplexer controls each of the optical switches 1 to 3 so as not to input a converted optical signal into an optical coupler until the optical power level of the converted optical signal is detected. Specifically, the optical wavelength converter in the transmission-side optical wavelength multiplexer receives the optical signal transmitted from the terminal device 1, converts the optical signal to an optical signal having the wavelength $\lambda 1$, and outputs the converted optical signal to the port A (see (1) and (2) of FIG. 6).

In the transmission-side optical wavelength multiplexer, a plurality of PDs connected to the ports detect the optical power levels of the converted optical signals input into the ports respectively (see (3) of FIG. 6). Specifically, the transmission-side optical wavelength multiplexer detects the optical power level of the converted optical signal having the wavelength $\lambda 1$ input into the port A.

Subsequently, when the optical power level of the converted wavelength is detected, the transmission-side optical wavelength multiplexer controls the optical switches 1 to 3 so as to input the converted optical signals into the optical coupler (see (4) of FIG. 6). Specifically, when the optical power level of the converted optical signal input into the port A is detected, the transmission-side optical wavelength multiplexer controls the optical switch 1 so as to input the converted optical signal into the optical coupler.

The transmission-side optical wavelength multiplexer inputs the converted optical signals input to the ports into the optical coupler, and causes the optical coupler to multiplex all the converted optical signals input from the ports to generate a multiplexed optical signal (see (5) and (6) of FIG. 6). Specifically, the transmission-side optical wavelength multiplexer inputs the converted optical signal having the wavelength $\lambda 1$ input to the port A into the optical coupler, causes the optical coupler to multiplex all the input converted optical signals to generate a multiplexed optical signal, and outputs the multiplexed optical signal to the transmission-light amplifying unit.

Subsequently, the transmission-side optical wavelength multiplexer amplifies the optical signal multiplexed and branched to an optical power level required for the transmission, and transmits the amplified multiplexed optical signal to the reception-side optical wavelength multiplexer (see (7) of FIG. 6).

The reception-side optical wavelength multiplexer receives the multiplexed optical signal, amplifies the optical power level thereof degraded during the transmission, and causes an received-light wavelength demultiplexer (AWG) to demultiplex the multiplexed optical signal into those of respective predetermined wavelengths (see (8) of FIG. 6). Then, the reception-side optical wavelength multiplexer detects the power level of the demultiplexed optical signal of the wavelength $\lambda 1$ as an optical power level of a received optical signal, and transmits the detected optical power level to an optical-level monitoring controller in the transmission-side optical wavelength multiplexer (see (9) of FIG. 6). Specifically, the reception-side optical wavelength multiplexer amplifies the received multiplexed optical signal, and causes the received-light wavelength demultiplexer to demultiplex the multiplexed optical signal into optical signals including the optical signal having the wavelength $\lambda 1$ set in the port X. The reception-side optical wavelength multiplexer detects the optical power level of the received optical signal having the wavelength $\lambda 1$ obtained by being demultiplexed, and transmits the detected optical power level to the optical-level monitoring controller in the transmission-side optical wavelength multiplexer.

Subsequently, the optical-level monitoring controller in the transmission-side optical wavelength multiplexer compares the detected optical power level of the converted wavelength with the detected optical power level of the received wavelength. When there is a difference in the comparison result, it is detected that the optical wavelength converter which converts the optical signal to a wavelength different from the predetermined wavelength set in a connected port is incorrectly connected to the port (see (10) of FIG. 6). Specifically, the transmission-side optical wavelength multiplexer compares the optical power level of the converted optical signal having the wavelength $\lambda 1$ input into the port A with the optical power level of the wavelength $\lambda 1$ after being received, obtained by being demultiplexed from the received multiplexed optical signal.

Then, the transmission-side optical wavelength multiplexer determines that the optical signal having the detected optical power level of the converted wavelength and the optical signal having the optical power level of the received wavelength are those which are converted to the wavelength $\lambda 1$. Thus, it is determined that there is no difference between the two optical power levels and the optical wavelength converter which converts the optical signal to the wavelength $\lambda 1$ is correctly connected to the port A with the wavelength $\lambda 1$ set therein.

Similarly to the method described above, when the optical signal is transmitted from the terminal device 2, the transmission-side optical wavelength multiplexer determines whether an optical wavelength converter connected to the terminal device 2 is connected to an improper port.

Specifically, the optical wavelength converter in the transmission-side optical wavelength multiplexer receives an optical signal transmitted from the terminal device 2, converts the optical signal into an optical signal having the wavelength $\lambda 3$, and outputs the converted optical signal to the port B, and then the optical power level of the converted optical signal having the wavelength $\lambda 3$ input into the port B is detected (see (11) to (13) of FIG. 6).

Thereafter, when the optical power level of the converted optical signal is detected, the transmission-side optical wavelength multiplexer controls the optical switch 2 so as to input the converted optical signal into the optical coupler, inputs the converted optical signals input into the port A and the port B into the optical coupler, causes the optical coupler to multiplex all the converted optical signals input from the port A and the port B to generate a multiplexed optical signal, and transmits the multiplexed optical signal to the reception-side optical wavelength multiplexer (see (14) to (17) of FIG. 6).

Subsequently, the reception-side optical wavelength multiplexer receives the multiplexed optical signal, demultiplexes the received multiplexed optical signal into optical signals having the wavelengths $\lambda 1$ and $\lambda 2$ set in the port X and the port Y respectively, detects the optical power levels of the demultiplexed optical signals, and transmits the detected optical power levels to the optical-level monitoring controller in the transmission-side optical wavelength multiplexer (see (18) and (19) of FIG. 6).

The optical-level monitoring controller in the transmission-side optical wavelength multiplexer compares the detected optical power level of the converted optical signal with the optical power level of the received optical signal. When there is a difference in the comparison result, it is detected that the optical wavelength converter which converts the optical signal into a wavelength different from the wavelength $\lambda 2$ set in the port B is incorrectly connected to the port B (see (20) of FIG. 6).

Specifically, the optical-level monitoring controller compares the optical power level of the optical signal after being converted into the wavelength $\lambda 3$ input into the port B with the optical power level of the wavelength $\lambda 2$ obtained by being received and demultiplexed, and then detects the optical power levels of the different wavelengths. Thus, it is determined that a difference is detected between the two optical power levels. The transmission-side optical wavelength multiplexer detects that the optical wavelength converter which converts the optical signal into a wavelength different from the wavelength $\lambda 2$ set in the port B is incorrectly connected to the port B.

As explained above, according to the third embodiment, the optical-level monitoring controller compares the optical power level of the converted optical signal and the optical power level of the optical signal demultiplexed into the predetermined wavelength from the multiplexed optical signal received in the reception-side optical wavelength multiplexer.

When there is a difference in the comparison result, it is detected that the optical wavelength converter is incorrectly connected to the port because the optical wavelength converter converts the optical signal into a wavelength different from the predetermined wavelength set in the port. Thus, the incorrect connection can be detected and the cost can further be reduced.

For example, in the optical wavelength multiplexing system, the multiplexed optical signal usually used therein is received and demultiplexed into wavelengths in one side, and each optical power level of the demultiplexed wavelengths detected for each demultiplexed wavelength is received in the other side by feedback, and the incorrect connection is thereby detected. Therefore, there is no need to add a new function to the ordinary optical wavelength multiplexing system. Accordingly, the cost can further be reduced.

In the first embodiment, the case where the optical switches are used as units to input the converted optical signals into the optical coupler is explained. However, the present invention is not limited to this configuration, and thus variable optical attenuators (VOA) instead of the optical switches may be used.

Figure 7:
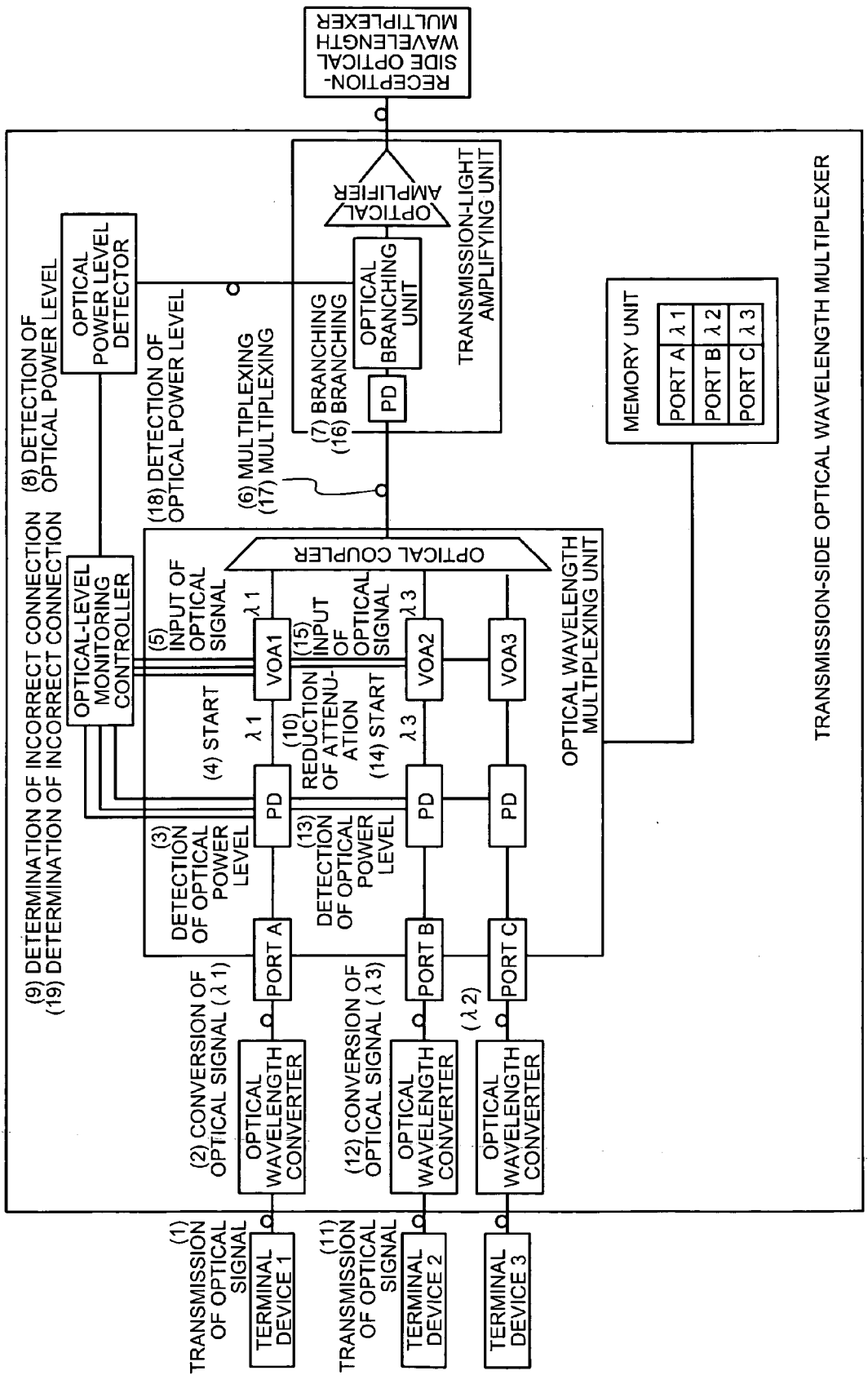
FIG. 7 is a schematic of an overall configuration of an optical wavelength multiplexing system according to a fourth embodiment.

In a fourth embodiment; a case where the variable optical attenuators (VOA) are used instead of the optical switches as units to input the converted optical signals into the optical coupler will be explained below with reference to FIG. 7. FIG. 7 is a schematic of an overall configuration of an optical wavelength multiplexing system according to the fourth embodiment.

As shown in FIG. 7, similarly to FIG. 1 according to the first embodiment, the optical wavelength multiplexing system according to the fourth embodiment includes a transmission-side optical wavelength multiplexer, a reception-side optical wavelength multiplexer, and terminal devices, which are connected to each other by optical fiber cables so as to enable mutual communication with each other. In the transmission-side optical wavelength multiplexer, similarly to the first embodiment, a plurality of optical wavelength converters each of which converts an input optical signal into an arbitrary preset wavelength to generate a converted optical signal are connected to a plurality of ports (port A to port C) in which predetermined wavelengths are preset respectively.

Specifically, similarly to the first embodiment, wavelengths $\lambda 1$ to $\lambda 3$ are set in the port A to port C respectively. The port A with the wavelength $\lambda 1$ set therein is connected to an optical wavelength converter that converts an input optical signal into the wavelength $\lambda 1$. The port B with the wavelength $\lambda 2$ set therein is connected to another optical wavelength converter that converts an input optical signal into the wavelength $\lambda 3$. The port C with the wavelength $\lambda 3$ set therein is connected to still another optical wavelength converter that converts an input optical signal into the wavelength $\lambda 2$. In other words, the optical wavelength converters that convert input optical signals into wavelengths different from the wavelengths set in the connected ports are connected to the port B and the port C.

The optical wavelength multiplexing system according to the fourth embodiment differs from the first embodiment in that the transmission-side optical wavelength multiplexer sets an attenuation in each of VOAs 1 to 3 to a maximum until the optical power level of a converted optical signal is detected, and reduces the attenuation to make the optical power level of the optical signal to be input into the optical coupler constant for each port, upon detection of the optical power level of the converted optical signal.

Specifically, similarly to the first embodiment, when an optical signal is input from the terminal device 1, the optical wavelength converter in the transmission-side optical wavelength multiplexer converts the optical signal into the wavelength $\lambda 1$ and inputs the converted optical signal into the port A, and then the optical power level of the converted optical signal received from the port A is detected in the transmission-side optical wavelength multiplexer (see (1) to (3) of FIG. 7).

When the optical power level of the converted optical signal is detected, the transmission-side optical wavelength multiplexer controls the VOA 1 so as to input the converted optical signal into the optical coupler, and inputs the converted optical signals input to the ports, into the optical coupler. The optical coupler multiplexes all the input converted optical signals to generate a multiplexed optical signal, and the optical branching unit branches the multiplexed optical signal. The transmission-side optical wavelength multiplexer detects each optical power level of the predetermined wavelengths set in the ports after being multiplexed, from the branched multiplexed optical signal, compares each detected optical power level of the converted wavelengths with each detected optical power level of the wavelengths of the branched optical signal. When there is a difference in the comparison result, it is detected that the optical wavelength converter is incorrectly connected to the port A because the optical wavelength converter converts the optical signal into a wavelength different from the predetermined wavelength set in the port A (see (4) to (9) of FIG. 7).

The transmission-side optical wavelength multiplexer reduces the attenuation of the VOA 1 so that the optical power level of the optical signal to be input into the optical coupler remains constant (see (10) of FIG. 7). Thereafter, optical signals transmitted from the terminal device 1 are input into the optical coupler while the attenuation thereof is gradually decreased, and the optical signals are multiplexed therein.

Likewise, the optical power level of the wavelength $\lambda 3$ of the branched multiplexed optical signal is detected after the optical signal input from the terminal device 2 is converted into the wavelength $\lambda 3$ and the optical power level thereof is detected. Then, it is detected that the optical wavelength converter that converts the optical signal into a wavelength different from the predetermined wavelength set in the port B is incorrectly connected to the port B (see (11) to (19) of FIG. 7). In this case, detection of the incorrect connection does not cause the transmission-side optical wavelength multiplexer to reduce the attenuation of the VOA 2. When no incorrect connection is detected (when the optical wavelength converter is correctly connected) via the manner described above, the transmission-side optical wavelength multiplexer reduces the attenuation of the VOA 2.

As explained above, according to the fourth embodiment, the attenuation is set to the maximum until the optical power level of the converted optical signal is detected, and the attenuation is reduced so that the optical power level of the input optical signal remains constant for each port upon detection of the optical power level of the converted optical signal. Therefore, when the attenuation for the input optical signal is arbitrarily set and the input optical signal is input by attenuating the optical power level of the input optical signal according to the set attenuation, it is possible to prevent degradation of the quality of the multiplexed optical signal and the optical wavelength multiplexing system. For example, multiplexing the wavelengths by keeping the optical power levels constant enables a multiplexed optical signal with higher quality to be transmitted, compared with the case where wavelengths with different optical power levels are multiplexed.

Although only the case of detecting the incorrect connection is explained in the first to the fourth embodiments, the present invention is not limited to this case. Therefore, when the incorrect connection is detected, a user (maintenance person) may be informed about a correct connecting destination.

Figure 8:
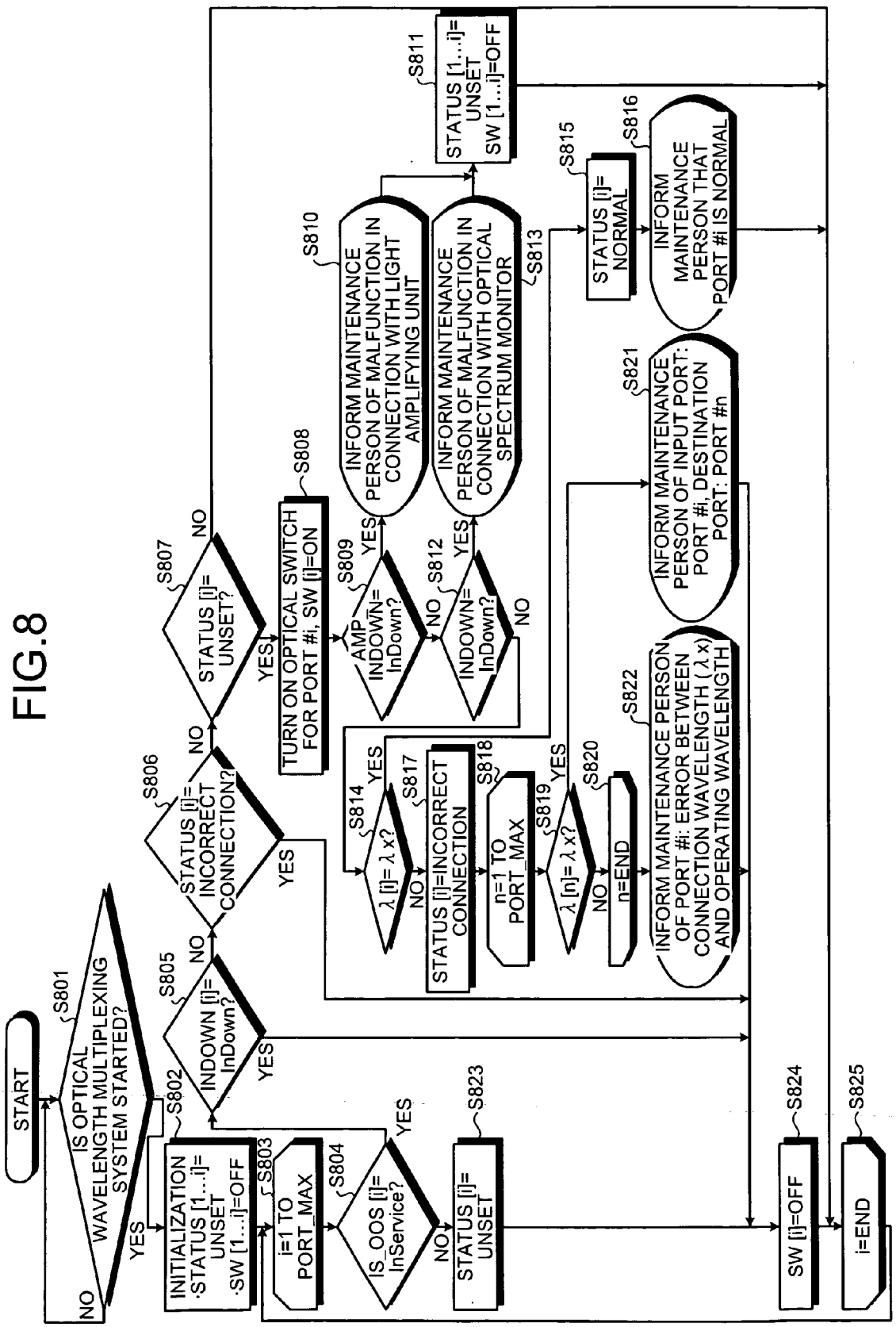
FIG. 8 is a flowchart of a process of determining an incorrect connection and a process for informing about a destination in an optical wavelength multiplexing system according to a fifth embodiment.

In a fifth embodiment, a case where the user (maintenance person) is informed about a correct connecting destination upon detection of the incorrect connection and an optical switch connected to the port where the incorrect connection is detected is turned off will be explained below with reference to FIG. 8. FIG. 8 is a flowchart of a process of determining the incorrect connection and a process for informing about a connecting destination in an optical wavelength multiplexing system according to the fifth embodiment.

As shown in FIG. 8, when the optical wavelength multiplexing system is started by the user or the like (step S801), the optical wavelength multiplexing system sets a connection status (STATUS [1 . . . i]) of an input port (PORT #1 to PORT #i (maximum number of ports)) to "unset", and sets a status of the optical switch (SW [i]) to "OFF" (step S802). The optical wavelength multiplexing system performs processes from steps S803 to S825, which is a loop process, on ports from a port 1 to the maximum number of ports (PORT #i) (step S803).

Thereafter, the optical wavelength multiplexing system determines whether an operating status (IS_OOS [i]) of the input port (PORT #i) is "InService" indicating a service status (step S804).

When the operating status IS_OOS [i] is "InService" ("YES" at step S804), the system determines whether an input status (INDOWN [i]) of the port is "InDown" indicating an ON status (step S805).

Subsequently, when the input status (INDOWN [i]) of the port is not "InDown" ("NO" at step S805), the system determines whether the connection status (STATUS [i]) of the PORT #i is an incorrect connection (step S806).

When the connection status (STATUS [i]) of the PORT #i is not an incorrect connection ("NO" at step S806), the system determines whether the connection status (STATUS [i]) of the input port (PORT #i) is "unset" (step S807).

When the connection status (STATUS [i]) of the input port (PORT #i) is not "unset" ("NO" at step S807), the system increments [i] by one, and performs the determination process on the next port if [i] is not the maximum number of ports (step S825).

On the other hand, when the connection status (STATUS [i]) of the input port (PORT #i) is "unset" ("YES" at step S807), the system turns "ON" the optical switch SW [i] connected to the input-port (step S808).

Subsequently, the system determines whether an input status (AMP_INDOWN) of a light amplifying unit is "InDown" (step S809).

When the input status (AMP_INDOWN) of the light amplifying unit is "InDown" ("YES" at step S809), the system informs the maintenance person (user) of "malfunction in connection with the light amplifying unit" (step S810), sets the connection statuses (STATUS [1 . . . i]) of all the input ports to "unset", turns "OFF" the optical switches (SW [1 . . . i]) connected to all the input ports (step S811), and performs the process at step S825.

On the other hand, when the input status (AMP_INDOWN) of the light amplifying unit is not "InDown" ("NO" at step S809), the system determines whether the light input status (INDOWN) of the optical spectrum monitor in the transmission-side optical wavelength multiplexer is "InDown" (step S812).

When it is determined that the light input status (INDOWN) of the optical spectrum monitor is "InDown" ("YES" at step S812), the system informs the maintenance person (user) of "malfunction in connection with the optical spectrum monitor" (step S813), and performs the processes from step S811.

On the other hand, when the light input status (INDOWN) of the optical spectrum monitor is not "InDown" ("NO" at step S812), the system compares a status of an operating wavelength λ[i] in the input port with a wavelength (λx) sent from the optical spectrum monitor (step S814).

When the wavelengths λ[i] and [λx] match with each other ("YES" at step S814), the system determines that the connection status (STATUS [i]) of the input port is "normal" (step S815), and informs the maintenance person that "the input port (PORT #i) is normal", and performs the process at step S825.

On the other hand, when λ[i] and [λx] do not match with each other ("NO" at step S814), the system determines that the connection status (STATUS [i]) of the input port is "incorrect connection" (step S817).

Thereafter, the system compares an operating wavelength (λn) of an input port (n) (n=1 to PORT_MAX (maximum number of ports)) with a wavelength [λx] sent from the optical spectrum monitor (step S818 to step S820).

When the operating wavelength (λn) and the wavelength [λx] match with each other ("YES" at step S819), the system informs the maintenance person of "input port: PORT #i, destination port: PORT #n" (step S821), turns "OFF" the connected optical switch (SW [i]) (step S824), and performs the process at step S825.

On the other hand, when the operating wavelength (λn) and the wavelength [λx] do not match with each other ("NO" at step S819), the system informs the maintenance person of "input port (PORT #i), operating wavelength error between the connection wavelength (λx) and the operating wavelength" (step S822), turns "OFF" the connected optical switch (SW [i]) (step S824), and performs the process at step S825.

At step S806, when the connection status (STATUS [i]) of the PORT #i is the incorrect connection ("YES" at step S806), the system turns "OFF" the connected optical switch (SW [i]) (step S824), and performs the process at step S825.

Similarly, at step S805, when the input status (INDOWN [i]) of the port is "InDown" ("YES" at step S805), the system turns "OFF" the connected optical switch (SW [i]) (step S824), and performs the process at step S825.

On the other hand, at step S804, when the operating status (IS_OOS [i]) is not "InService" ("NO" at step S804), the system sets the connection status (STATUS [i]) of the input port to "unset" (step S823), and performs the processes from step S824.

In the process at step S825, "i" is incremented one by one, and the processes from step S804 to step S824 are performed until "i" reaches the maximum number "n". When "i" reaches the maximum number "n", the system ends the process.

As explained above, according to the fifth embodiment, when the incorrect connection is detected, the optical switch connected to the port is controlled so as not to input the converted optical signal into the optical coupler. Therefore, an optical signal having a wavelength erroneously input can be prevented from being mixed in the other optical signals upon multiplexing. As a result, degradation of the quality of the multiplexed optical signal and the optical wavelength multiplexing system can be prevented.

For example, when the optical switch or the VOA is used as an optical-signal switching unit, an optical signal having incorrectly input wavelength also passes through the optical switch, and the optical signal multiplexer multiplexes optical signals including the erroneous optical signal. Therefore, by stopping the optical-signal switching unit connected to an incorrectly connected port, the optical signal having erroneously input wavelength can be prevented from being mixed in the other optical signals upon multiplexing. Thus, degradation of the quality of the multiplexed optical signal and the optical wavelength multiplexing system can be prevented.

According to the fifth embodiment, when the incorrect connection is detected, the predetermined wavelengths set in respective ports are searched to detect a port as a correct connecting destination of an optical wavelength converter which is connected to an improper port. Therefore, the incorrect connection can be detected and the port to be correctly connected can also be specified. Thus, the burden on the user due to an occurrence of the incorrect connection can be reduced and the incorrect connection can be promptly dealt with.

For example, when wavelengths $\lambda 1$ to $\lambda 5$ are set in ports 1 to 5 respectively, and the port 2 is incorrectly connected with an optical fiber cable of the wavelength $\lambda 3$, it is not only detected that the port 2 is incorrectly connected but also specified that the port 3 is a correct destination of the optical fiber cable incorrectly connected to the port 2. The detection can thereby be informed to the user, and thus, the burden on the user due to the occurrence of the incorrect connection can be reduced and the incorrect connection can be promptly dealt with.

Although the embodiments according to the present invention are explained above, the present invention may be embodied in various manners other than the embodiments. Hence, different embodiments will be explained below by referring to (1) the number of ports and (2) system configuration.

(1) Number of Ports

For example, in the first to the fifth embodiments, the case where the optical wavelength multiplexing system has three ports is explained. However, the present invention is not limited to this configuration, and four ports may be provided, in other words, there is no limitation to the number. Moreover, a plurality of optical wavelength converters may be provided by the corresponding number of the ports so as to be connected to the respective ports, or one optical wavelength converter may be connected to a plurality of ports. When one optical wavelength converter is connected to a plurality of ports, the optical wavelength converter has a plurality of wavelengths set therein because different wavelengths are set in the ports, and optical signals converted into different wavelengths are thereby input into the ports respectively.

(2) System Configuration

The components of the devices shown in the drawings are functionally conceptual, and do not always have to be physically configured as shown in the drawings. Specifically, a specific configuration in which the devices are dispersed or integrated is not limited to the shown configuration. The devices may be configured by functionally or physically dispersing or integrating all or a part of the devices in arbitrary units according to various loads or usage patterns. For example, the optical-level monitoring controller is divided into the input controller and the incorrect connection detector. Furthermore, all or arbitrary portions of the processing functions performed in the respective devices may be implemented by a CPU and a program to be analyzed and executed by the CPU, or as a hardware based on a wired logic.

Moreover, all or a part of the processes explained as those automatically executed, such as the amplification process and demultiplexing process of the multiplexed optical signal, of the processes explained in the embodiments, can be also manually executed. Alternatively, all or a part of the processes explained as those manually executed, such as the process for setting wavelength in each port, can be also automatically executed using any one of known methods. Besides, information (FIG. 3, for example) including the procedure, control procedure, specific names, and various data and parameters shown in the document and the drawings can arbitrarily be changed unless otherwise specified.

According to one aspect of the invention, the incorrect connection can be detected and the cost for constructing the system can be reduced.

For example, by using the optical switches as the input units and using the optical coupler (CPL) as the optical signal multiplexer, the incorrect connection in a port can be detected. As a result, the cost for constructing the system can be reduced, compared with the case where an expensive arrayed waveguide grating (AWG) is used to detect the incorrect connection. Moreover, it is possible to reconnect an incorrectly connected optical fiber cable to a proper destination and to change the setting of a port according to a wavelength transmitted over an optical fiber cable, without stopping the system.

According to another aspect of the invention, the incorrect connection can be detected in the transmission side of the optical wavelength multiplexing system, and thus, the cost for constructing the system can be further reduced.

For example, when the optical switches are used as the optical-signal switching units and the optical coupler (CPL) is used as the optical signal multiplexer, an input optical signal having an incorrect wavelength due to the incorrect connection is also multiplexed in the optical signals. By detecting the incorrect connection in the transmission side of the optical wavelength multiplexing system before the transmission of the multiplexed optical signal, the cost for constructing the system can further be reduced, and degradation of the quality of the multiplexed optical signal and the optical wavelength multiplexing system can be prevented.

According to still another aspect of the invention, it is possible to detect the incorrect connection and further reduce the cost.

For example, in the optical wavelength multiplexing system, a received multiplexed optical signal usually used therein is demultiplexed in one side, and each optical power level of the demultiplexed optical signal detected for each demultiplexed wavelength is received in the other side by feedback, and the incorrect connection is thereby detected. Therefore, there is no need to add a new function to the ordinary optical wavelength multiplexing system. Accordingly, the cost can further be reduced.

According to still another aspect of the invention, the degradation of the quality of the multiplexed optical signal and the optical wavelength multiplexing system can be prevented.

For example, multiplexing wavelengths by keeping the optical power levels constant allows transmission of a higher-quality multiplexed optical signal, compared with the case where wavelengths of different optical power levels are multiplexed.

According to still another aspect of the invention, when optical signals are to be multiplexed, an optical signal of an erroneously input wavelength can be prevented from being mixed in the optical signals, and thus, the degradation of the quality of the multiplexed optical signal and the optical wavelength multiplexing system can be prevented.

For example, when the optical switch or the VOA is used as the optical-signal switching unit, an optical signal having the erroneously input wavelength also passes through the optical switch, and the optical signal multiplexer multiplexes optical signals including the erroneous optical signal. Therefore, by stopping the optical-signal switching unit connected to an incorrectly connected port, the optical signal of the erroneously input wavelength can be prevented from being mixed in the other signals upon multiplexing. As a result, the degradation of the quality of the multiplexed optical signal and the optical wavelength multiplexing system can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical wavelength multiplexing system comprising:
a plurality of optical wavelength converters that convert input optical signals into arbitrary preset wavelengths and generate converted optical signals respectively;
a plurality of ports in which predetermined wavelengths are preset and to which the optical wavelength converters are connected respectively;
a plurality of first optical-power-level detectors that are connected to the ports respectively, and detect optical power levels of the converted optical signals input into the ports respectively;
an optical coupler that multiplexes all the converted optical signals input from the ports to generate a multiplexed optical signal, the generated multiplexed optical signal being transmitted to a receiving device in the optical wavelength multiplexing system and dennultiplexed into optical signals of predetermined wavelengths;
a plurality of input units that are provided in the ports respectively and input the converted optical signals input into the ports, into the optical coupler;
an input controller that controls each of the input units so as not to input the converted optical signal into the optical coupler until an optical power level of the converted optical signal is detected by the first optical-power-level detector, and also controls each of the input units so as to input the converted optical signal into the optical coupler when the optical power level of the converted optical signal is detected;
a second optical-power-level detector that detects, from the multiplexed optical signal, each optical power level of the predetermined wavelengths set in the ports after the converted optical signals are multiplexed;
an incorrect connection detector that compares each optical power level of the converted optical signals detected by the first optical-power-level detector with each optical power level of the predetermined wavelengths detected by the second optical-power-level detector, and detects that an optical wavelength converter that converts the optical signal into a wavelength different from the predetermined wavelength set in a connected port is incorrectly connected to the port when there is a difference therebetween in the comparison result;
an optical branching unit that branches the multiplexed optical signal multiplexed by the optical coupler; and
a multiplexed-optical-signal demultiplexer that demultiplexes the branched multiplexed optical signal into optical signals of the respective predetermined wavelengths set in the ports, wherein
the second optical-power-level detector detects, from the demultiplexed optical signals, each optical power level of the predetermined wavelengths set in the ports after the branched multiplexed optical signal is demultiplexed, and
the incorrect connection detector compares each optical power level of the converted optical signals detected by the first optical-power-level detector with each optical power level of demultiplexed optical signals detected by the second optical-power-level detector, and detects that an optical wavelength converter that converts the optical signal into a wavelength different from the predetermined wavelength set in a connected port is incorrectly connected to the port when there is a difference therebetween in the comparison result.

2. An optical wavelength multiplexing system comprising:
a plurality of optical wavelength converters that convert input optical signals into arbitrary preset wavelengths and generate converted optical signals respectively;
a plurality of ports in which predetermined wavelengths are preset and to which the optical wavelength converters are connected respectively;
a plurality of first optical-power-level detectors that are connected to the ports respectively, and detect optical power levels of the converted optical signals input into the ports respectively;
an optical coupler that multiplexes all the converted optical signals input from the ports to generate a multiplexed optical signal, the generated multiplexed optical signal being transmitted to a receiving device in the optical wavelength multiplexing system and demultiplexed into optical signals of predetermined wavelengths;
a plurality of input units that are provided in the ports respectively and input the converted optical signals input into the ports, into the optical coupler;
an input controller that controls each of the input units so as not to input the converted optical signal into the optical coupler until an optical power level of the converted optical signal is detected by the first optical-power-level detector, and also controls each of the input units so as to input the converted optical signal into the optical coupler when the optical power level of the converted optical signal is detected;
a second optical-power-level detector that detects, from the multiplexed optical signal, each optical power level of the predetermined wavelengths set in the ports after the converted optical signals are multiplexed;
an incorrect connection detector that compares each optical power level of the converted optical signals detected by the first optical-power-level detector with each optical power level of the predetermined wavelengths detected by the second optical-power-level detector, and detects that an optical wavelength converter that converts the optical signal into a wavelength different from the predetermined wavelength set in a connected port is incorrectly connected to the port when there is a difference therebetween in the comparison result,
wherein
the incorrect connection detector receives each optical power level of the demultiplexed optical signals of the predetermined wavelengths which are generated by demultiplexing the multiplexed optical signal in the receiving device, compares the received each optical power level of the demultiplexed optical signals with each optical power level of the converted optical signals detected by the first optical-power-level detector, and detects that an optical wavelength converter that converts the optical signal into a wavelength different from the predetermined wavelength set in a connected port is incorrectly connected to the port when there is a difference therebetween in the comparison result.

3. An optical wavelength multiplexing system comprising:
a plurality of optical wavelength converters that convert input optical signals into arbitrary preset wavelengths and generate converted optical signals respectively;
a plurality of ports in which predetermined wavelengths are preset and to which the optical wavelength converters are connected respectively;
a plurality of first optical-power-level detectors that are connected to the ports respectively, and detect optical power levels of the converted optical signals input into the ports respectively;
an optical coupler that multiplexes all the converted optical signals input from the ports to generate a multiplexed optical signal, the generated multiplexed optical signal being transmitted to a receiving device in the optical wavelength multiplexing system and dennultiplexed into optical signals of predetermined wavelengths;
a plurality of input units that are provided in the ports respectively and input the converted optical signals input into the ports, into the optical coupler;
an input controller that controls each of the input units so as not to input the converted optical signal into the optical coupler until an optical power level of the converted optical signal is detected by the first optical-power-level detector, and also controls each of the input units so as to input the converted optical signal into the optical coupler when the optical power level of the converted optical signal is detected;
a second optical-power-level detector that detects, from the multiplexed optical signal, each optical power level of the predetermined wavelengths set in the ports after the converted optical signals are multiplexed;
an incorrect connection detector that compares each optical power level of the converted optical signals detected by the first optical-power-level detector with each optical power level of the predetermined wavelengths detected by the second optical-power-level detector, and detects that an optical wavelength converter that converts the optical signal into a wavelength different from the predetermined wavelength set in a connected port is incorrectly connected to the port when there is a difference therebetween in the comparison result,
wherein
each of the input units has an attenuation arbitrarily set therein for each of the converted optical signals to be input into the optical coupler, attenuates each optical power level of the converted optical signals according to the set attenuation, and inputs each of the attenuated optical signals into the optical coupler, and
the input controller sets the attenuation of each of the input units to a maximum until the first optical-power-level detector detects each optical power level of the converted optical signals, and reduces the attenuation for each of the ports so that optical power levels of the converted optical signals to be input into the optical coupler remain constant, when the first optical-power-level detector detects each optical power level of the converted optical signals.

4. The optical wavelength multiplexing system according to claim 2, further comprising:
an optical branching unit that branches the multiplexed optical signal multiplexed by the optical coupler, wherein
the second optical-power-level detector detects each optical power level, after the multiplexed optical signal is branched, of the predetermined wavelengths set in the ports, from the branched multiplexed optical signal, and
the incorrect connection detector compares each optical power level of the converted optical signals detected by the first optical-power-level detector with each optical power level of the wavelengths of the branched multiplexed optical signal detected by the second optical-power-level detector, and detects that an optical wavelength converter that converts the optical signal into a wavelength different from the predetermined wavelength set in a connected port is incorrectly connected to the port when there is a difference therebetween in the comparison result.

5. The optical wavelength multiplexing system according to claim 1, wherein when the incorrect connection is detected by the incorrect connection detector, the input controller controls the input unit connected to the port in which the incorrect connection is detected so as not to input the converted optical signal into the optical coupler.

6. The optical wavelength multiplexing system according to claim 1, wherein when the incorrect connection is detected, the incorrect connection detector searches the predetermined wavelengths set in the respective ports, and detects a correct connecting destination port of the optical wavelength converter incorrectly connected to the port.

7. An optical wavelength multiplexing method in an optical wavelength multiplexing system where a plurality of optical wavelength converters which convert input optical signals into arbitrary preset wavelengths and generate converted optical signals respectively, are respectively connected to a plurality of ports in which predetermined wavelengths are preset, and where the converted optical signals are multiplexed in a transmitting device and transmitted to a receiving device to be demultiplexed into optical signals of predetermined wavelengths, the optical wavelength multiplexing method comprising:
first detecting each optical power level of the converted optical signals input into the ports;
multiplexing, using an optical coupler, all the converted optical signals input from the ports to generate a multiplexed optical signal;
inputting the converted optical signals input into the ports for the multiplexing;
controlling the inputting so as not to input the converted optical signal for the multiplexing until an optical power level of the converted optical signal is detected in the first detecting, and also controlling the inputting so as to input the converted optical signal for the multiplexing when the optical power level of the converted optical signal is detected;
second detecting, from the multiplexed optical signal, each optical power level of the predetermined wavelengths set in the ports after the converted optical signals are multiplexed; and
comparing each optical power level of the converted optical signals detected in the first detecting of each optical power level of the converted optical signals with each optical power level of the predetermined wavelengths detected in the second detecting of each optical power level of the predetermined wavelengths after the converted optical signals are multiplexed, and third detecting that an optical wavelength converter that converts the optical signal into a wavelength different from the predetermined wavelength set in a connected port is incorrectly connected to the port when there is a difference therebetween in the comparison result;

branching the multiplexed optical signal multiplexed by the optical coupler; and demultiplexing the branched multiplexed optical signal into optical signals of the respective predetermined wavelengths set in the ports, wherein the second detecting includes detecting, from the dennultiplexed optical signals, each optical power level of the predetermined wavelengths set in the ports after the branched multiplexed optical signal is dennultiplexed, and the comparing includes comparing each optical power level of the converted optical signals detected in the first detecting with each optical power level of dennultiplexed optical signals detected in the second detecting, and third detecting includes detecting that an optical wavelength converter that converts the optical signal into a wavelength different from the predetermined wavelength set in a connected port is incorrectly connected to the port when there is a difference therebetween in the comparison result.

8. An optical wavelength multiplexing method in an optical wavelength multiplexing system where a plurality of optical wavelength converters which convert input optical signals into arbitrary preset wavelengths and generate converted optical signals respectively, are respectively connected to a plurality of ports in which predetermined wavelengths are preset, and where the converted optical signals are multiplexed in a transmitting device and transmitted to a receiving device to be demultiplexed into optical signals of predetermined wavelengths, the optical wavelength multiplexing method comprising:

first detecting each optical power level of the converted optical signals input into the ports;

multiplexing, using an optical coupler, all the converted optical signals input from the ports to generate a multiplexed optical signal;

inputting the converted optical signals input into the ports for the multiplexing;

controlling the inputting so as not to input the converted optical signal for the multiplexing until an optical power level of the converted optical signal is detected in the first detecting, and also controlling the inputting so as to input the converted optical signal for the multiplexing when the optical power level of the converted optical signal is detected;

second detecting, from the multiplexed optical signal, each optical power level of the predetermined wavelengths set in the ports after the converted optical signals are multiplexed; and comparing each optical power level of the converted optical signals detected in the first detecting of each optical power level of the converted optical signals with each optical power level of the predetermined wavelengths detected in the second detecting of each optical power level of the predetermined wavelengths after the converted optical signals are multiplexed, and third detecting that an optical wavelength converter that converts the optical signal into a wavelength different from the predetermined wavelength set in a connected port is incorrectly connected to the port when there is a difference therebetween in the comparison result, wherein the comparing includes receiving each optical power level of the demultiplexed optical signals of the predetermined wavelengths which are generated by demultiplexing the multiplexed optical signal in the receiving device, and comparing the received each optical power level of the demultiplexed optical signals with each optical power level of the converted optical signals detected in the first detecting, and the third detecting includes detecting that an optical wavelength converter that converts the optical signal into a wavelength different from the predetermined wavelength set in a connected port is incorrectly connected to the port when there is a difference therebetween in the comparison result.

9. An optical wavelength multiplexing method in an optical wavelength multiplexing system where a plurality of optical wavelength converters which convert input optical signals into arbitrary preset wavelengths and generate converted optical signals respectively, are respectively connected to a plurality of ports in which predetermined wavelengths are preset, and where the converted optical signals are multiplexed in a transmitting device and transmitted to a receiving device to be demultiplexed into optical signals of predetermined wavelengths, the optical wavelength multiplexing method comprising:

first detecting each optical power level of the converted optical signals input into the ports;

multiplexing, using an optical coupler, all the converted optical signals input from the ports to generate a multiplexed optical signal;

inputting the converted optical signals input into the ports for the multiplexing;

controlling the inputting so as not to input the converted optical signal for the multiplexing until an optical power level of the converted optical signal is detected in the first detecting, and also controlling the inputting so as to input the converted optical signal for the multiplexing when the optical power level of the converted optical signal is detected;

second detecting, from the multiplexed optical signal, each optical power level of the predetermined wavelengths set in the ports after the converted optical signals are multiplexed; and comparing each optical power level of the converted optical signals detected in the first detecting of each optical power level of the converted optical signals with each optical power level of the predetermined wavelengths detected in the second detecting of each optical power level of the predetermined wavelengths after the converted optical signals are multiplexed, and third detecting that an optical wavelength converter that converts the optical signal into a wavelength different from the predetermined wavelength set in a connected port is incorrectly connected to the port when there is a difference therebetween in the comparison result, wherein each of the inputting includes, using an attenuation arbitrarily set therein for each of the converted optical signals to be input into the optical coupler, attenuating each optical power level of the converted optical signals according to the set attenuation, and inputing each of the attenuated optical signals into the optical coupler, and the controlling includes setting the attenuation of each of the inputting to a maximum until the first detecting detects each optical power level of the converted optical signals, and reducing the attenuation for each of the ports so that optical power levels of the converted optical signals to be input into the optical coupler remain constant, when the first detecting detects each optical power level of the converted optical signals.

* * * * *